US010622796B2

(12) United States Patent
MacNaughton et al.

(10) Patent No.: US 10,622,796 B2
(45) Date of Patent: Apr. 14, 2020

(54) MOUNTING ASSEMBLY AND KIT FOR A MOUNTING ASSEMBLY

(71) Applicant: Tyco Electronics UK Ltd, Swindon (GB)

(72) Inventors: Roy MacNaughton, Swindon (GB); Tomasz Kopinski, Swindon (GB)

(73) Assignee: Tyco Electronics UK Ltd, Swindon (GB)

( * ) Notice: Subject to any disclaimer, the term of this patent is extended or adjusted under 35 U.S.C. 154(b) by 0 days.

(21) Appl. No.: 15/995,630

(22) Filed: Jun. 1, 2018

(65) Prior Publication Data
US 2018/0278035 A1  Sep. 27, 2018

Related U.S. Application Data

(63) Continuation of application No. PCT/EP2016/079258, filed on Nov. 30, 2016.

(30) Foreign Application Priority Data

Dec. 1, 2015 (EP) ..................................... 15197370

(51) Int. Cl.
*F16M 13/00* (2006.01)
*H02G 3/32* (2006.01)
(52) U.S. Cl.
CPC ............ *H02G 3/32* (2013.01); *F16M 13/005* (2013.01)
(58) Field of Classification Search
CPC .... H02G 3/32; H02G 3/30; H02G 3/26; F16L 3/12; F16L 3/00

(Continued)

(56) References Cited

U.S. PATENT DOCUMENTS 9,115,506 B2 *  8/2015 Hill ...................... E04H 17/1421
9,438,020 B2    9/2016 Shimada
(Continued)

FOREIGN PATENT DOCUMENTS

CN     105008185 A       10/2015
DE     102011001576 A1   9/2012
DE     20 2015 100 360 U1  4/2015

OTHER PUBLICATIONS

PCT Notification of Transmittal of the International Search Report and the Written Opinion of the International Searching Authority, dated Feb. 3, 2017, 10 pages.

(Continued)

*Primary Examiner* — Steven M Marsh
(74) *Attorney, Agent, or Firm* — Barley Snyder

(57) ABSTRACT

A mounting assembly for mounting a cable on an electrically conductive structure comprises a mounting bracket and a cover mounted on the mounting bracket and movable with respect to the mounting bracket between a bracket mounting position and a cable mounting position. The mounting bracket has a mounting element receptacle and a cable holding device receptacle. The mounting element receptacle receives a mounting element that attaches the mounting bracket to the electrically conductive structure. The cable holding device receptacle receives a cable holding device that holds the cable. The mounting element receptacle is accessible from a cover side of the mounting bracket and the cable holding device receptacle is covered by the cover in the bracket mounting position. The mounting element receptacle is covered by the cover and the cable holding device receptacle is accessible from the cover side of the mounting bracket in the cable mounting position.

15 Claims, 23 Drawing Sheets

(58) Field of Classification Search
USPC .................. 248/65, 70, 72, 73, 74.1, 74.2
See application file for complete search history.

(56) References Cited

U.S. PATENT DOCUMENTS

| | | | |
|---|---|---|---|
| 9,447,899 B2* | 9/2016 | Minami | B64D 37/005 |
| 10,190,703 B2* | 1/2019 | Alquier | F16L 3/10 |
| 2002/0074461 A1* | 6/2002 | Gombert | H02G 3/263 |
| | | | 248/74.1 |
| 2012/0175473 A1* | 7/2012 | Fraze | A45F 5/00 |
| | | | 248/74.1 |
| 2012/0318935 A1* | 12/2012 | Benedetti | F16L 3/1075 |
| | | | 248/74.1 |
| 2014/0014775 A1 | 1/2014 | Luthi et al. | |
| 2014/0306071 A1* | 10/2014 | Stechmann | H02G 3/32 |
| | | | 248/74.1 |

OTHER PUBLICATIONS

Abstract of DE 20 2015 100 360, dated Mar. 11, 2015, 1 page.
Chinese First Office Action with English translation, Chinese Patent Application No. 2016800700881, dated Jul. 29, 2019, 11 pages.
Abstract of DE 10 2011 001 576 A1, dated Sep. 27, 2012, 1 page.

* cited by examiner

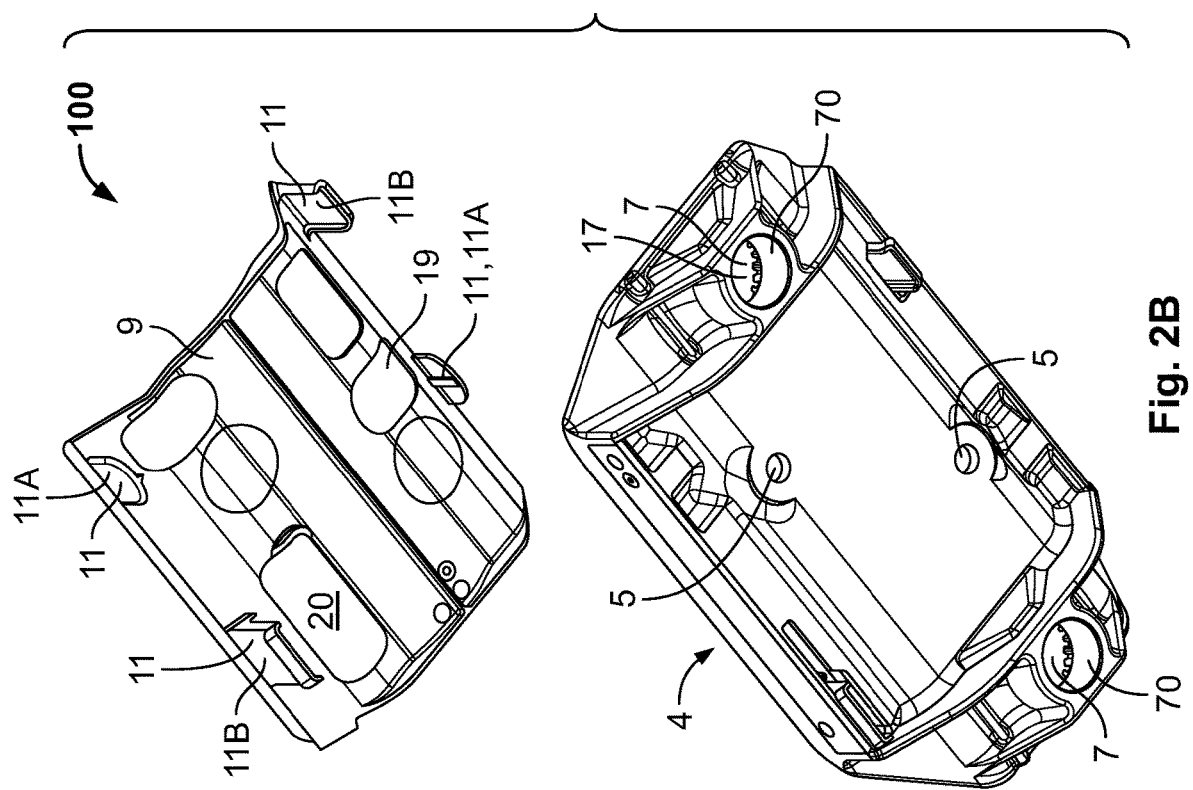
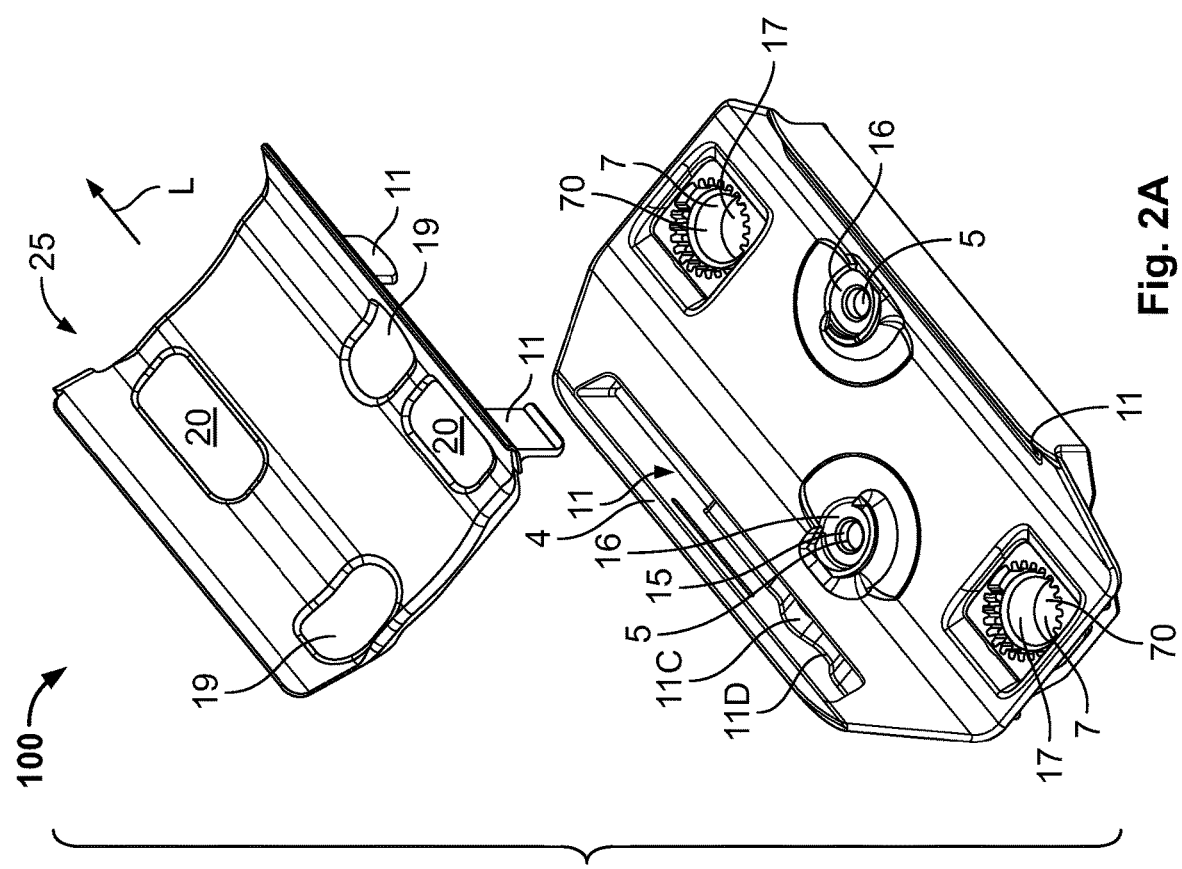
Fig. 2B
Fig. 2A

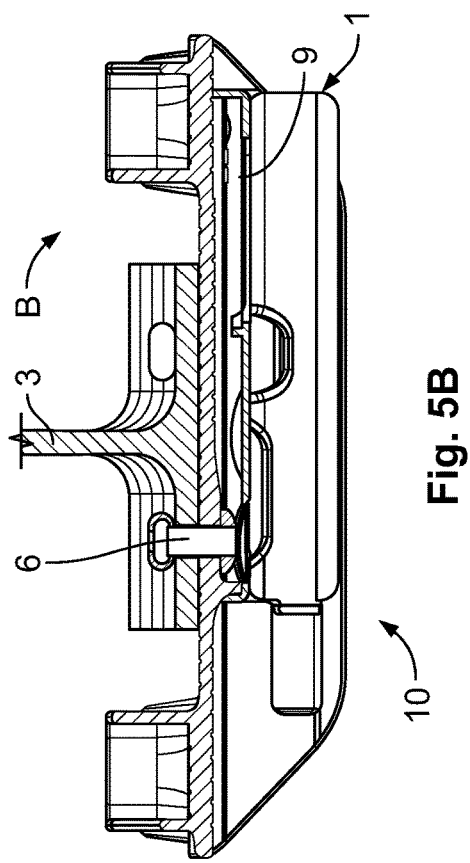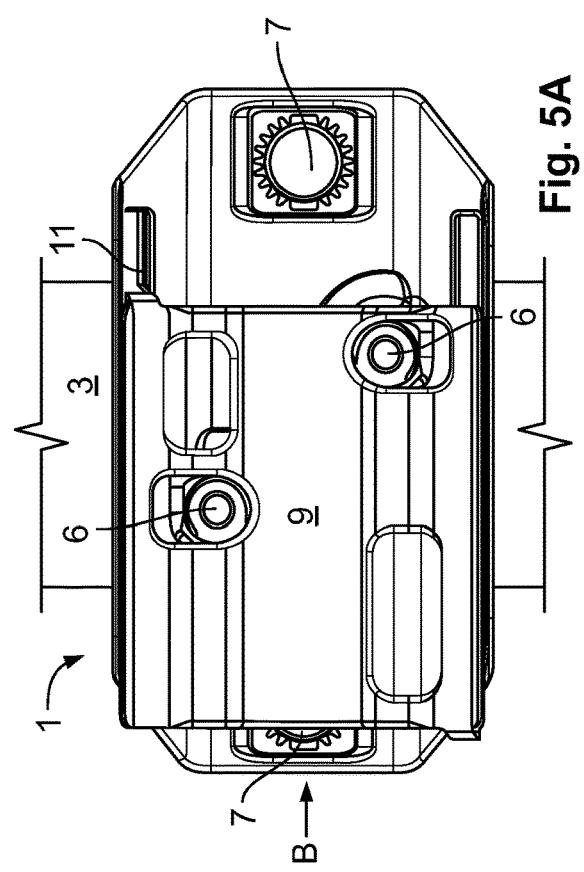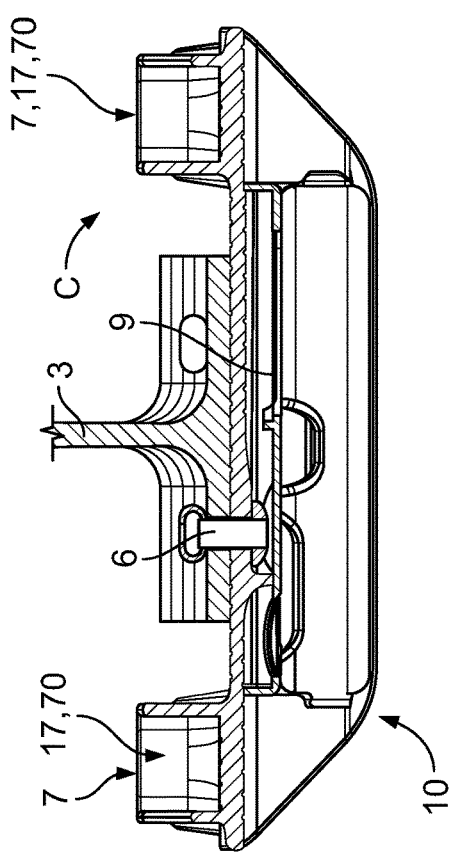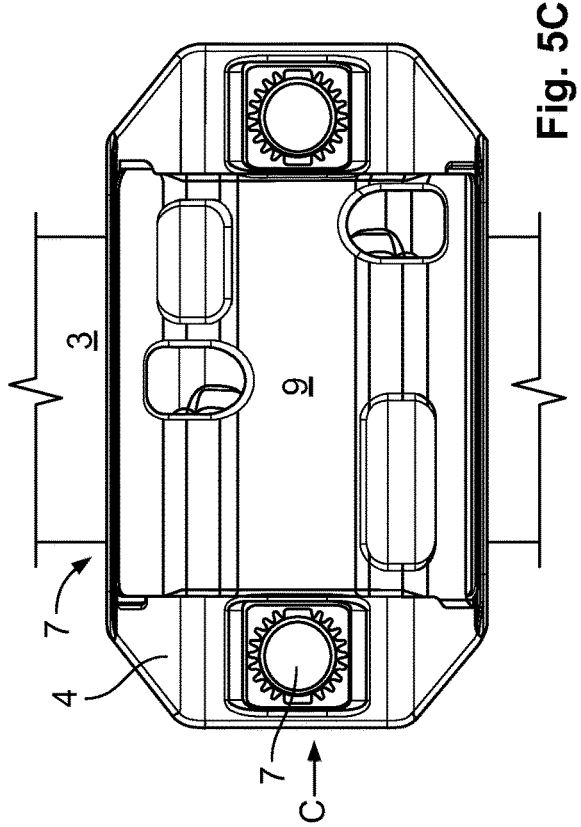

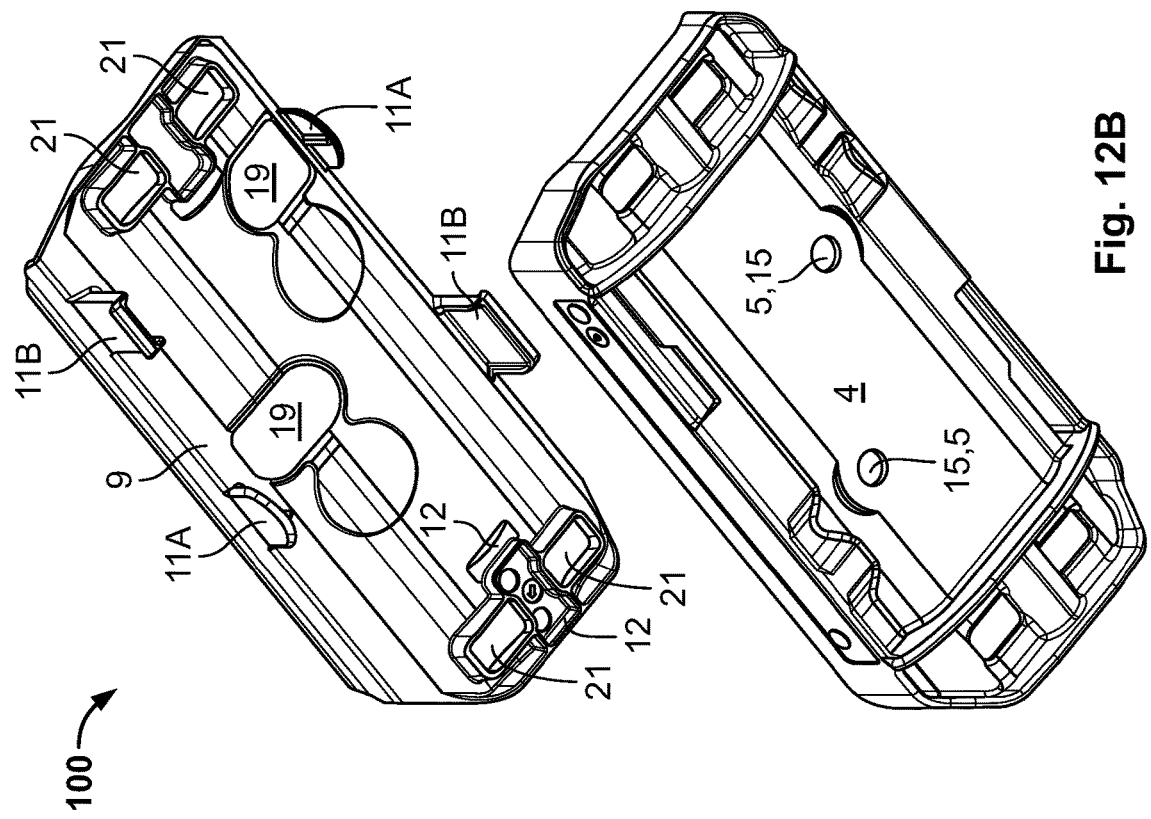
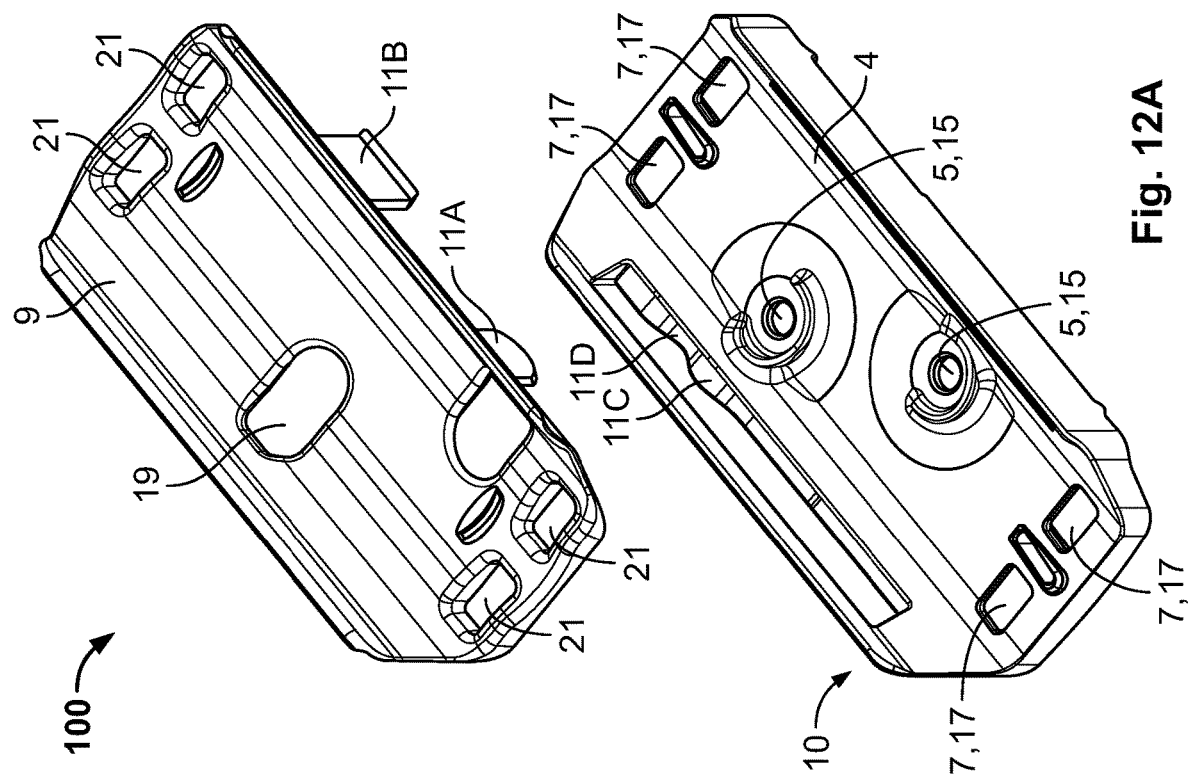
Fig. 12B
Fig. 12A

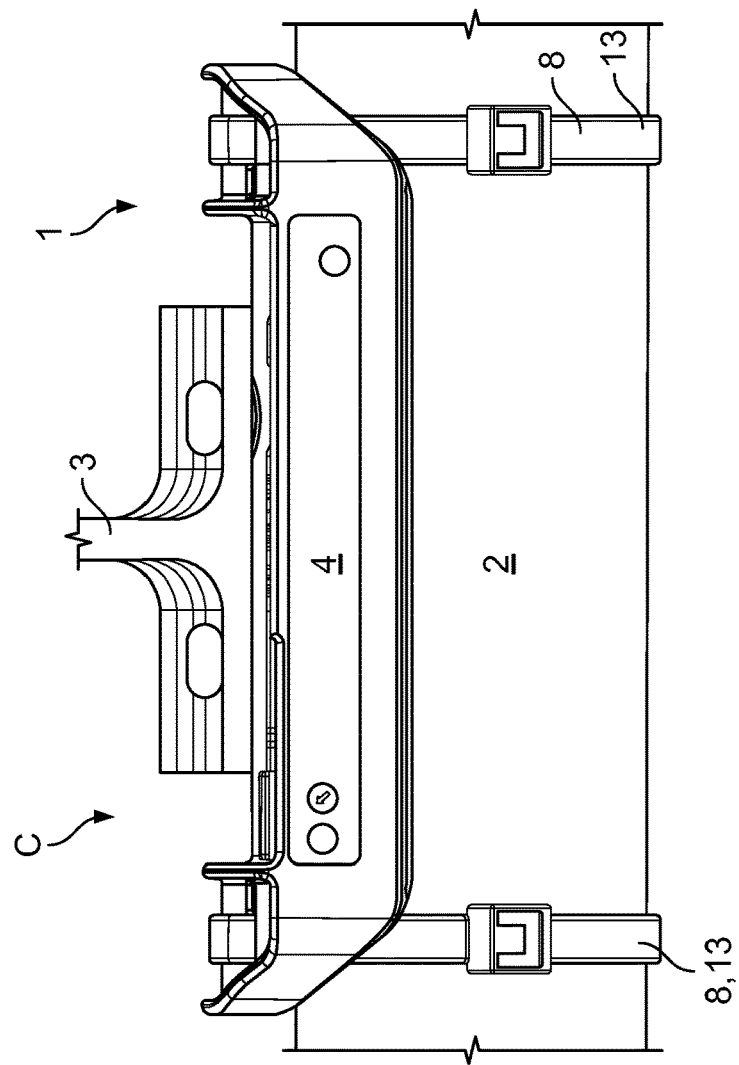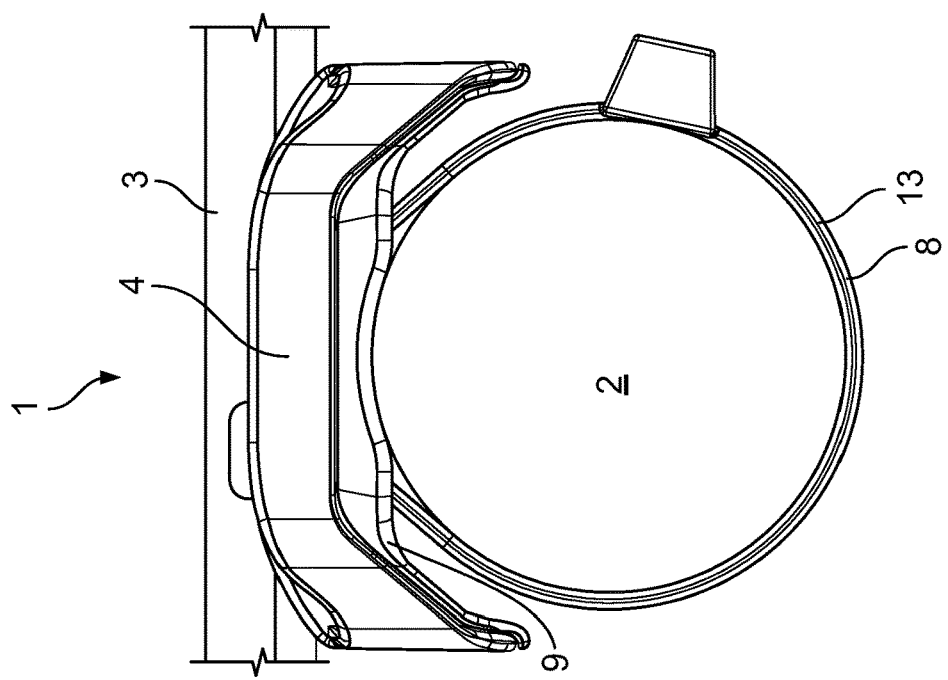

MOUNTING ASSEMBLY AND KIT FOR A MOUNTING ASSEMBLY

CROSS-REFERENCE TO RELATED APPLICATIONS

This application is a continuation of PCT International Application No. PCT/EP2016/079258, filed on Nov. 30, 2016, which claims priority under 35 U.S.C. § 119 to European Patent Application No. 15197370.8, filed on Dec. 1, 2015.

FIELD OF THE INVENTION

The present invention relates to a mounting assembly and, more particularly, to a mounting assembly used to mount a cable on an electrically conductive structure.

BACKGROUND

A mounting assembly is commonly used to mount a cable on an electrically conductive structure. In a particular application, the conductive structure is the fuselage of an airplane. In order to protect the conductive structure from electric arcing or short-circuits in the event that insulation of the cable is damaged, current systems use insulating caps that are mounted on metallic mounting elements such as rivets or bolts. However, it is possible to mount the cable even if these caps are not in place, if they have not been mounted during the assembly. This poses a potential risk, as nothing would be disposed between the damaged cable and a metallic mounting element in such an instance.

SUMMARY

A mounting assembly for mounting a cable on an electrically conductive structure comprises a mounting bracket and a cover mounted on the mounting bracket and movable with respect to the mounting bracket between a bracket mounting position and a cable mounting position. The mounting bracket has a mounting element receptacle and a cable holding device receptacle. The mounting element receptacle receives a mounting element that attaches the mounting bracket to the electrically conductive structure. The cable holding device receptacle receives a cable holding device that holds the cable. The mounting element receptacle is accessible from a cover side of the mounting bracket and the cable holding device receptacle is covered by the cover in the bracket mounting position. The mounting element receptacle is covered by the cover and the cable holding device receptacle is accessible from the cover side of the mounting bracket in the cable mounting position.

BRIEF DESCRIPTION OF THE DRAWINGS

The invention will now be described by way of example with reference to the accompanying Figures, of which:

FIG. 2A is an exploded top perspective view of the mounting assembly of FIG. 1A;

FIG. 2B is an exploded bottom perspective view of the mounting assembly of FIG. 1A;

FIG. 5A is a top view of the mounting assembly of FIG. 1A in the bracket mounting position;

FIG. 5B is a sectional side view of the mounting assembly of FIG. 1A in the bracket mounting position;

FIG. 5C is a top view of the mounting assembly of FIG. 1A in the cable mounting position;

FIG. 5D is a sectional side view of the mounting assembly of FIG. 1A in the cable mounting position;

FIG. 12A is an exploded top perspective view of the mounting assembly of FIG. 11A;

FIG. 12B is an exploded bottom perspective view of the mounting assembly of FIG. 11A;

FIG. 15A is a side view of the mounting assembly of FIG. 11A with a cable holding device;

FIG. 15B is a front view of the mounting assembly of FIG. 15A;

DETAILED DESCRIPTION OF THE EMBODIMENT(S)

Figure 1A:
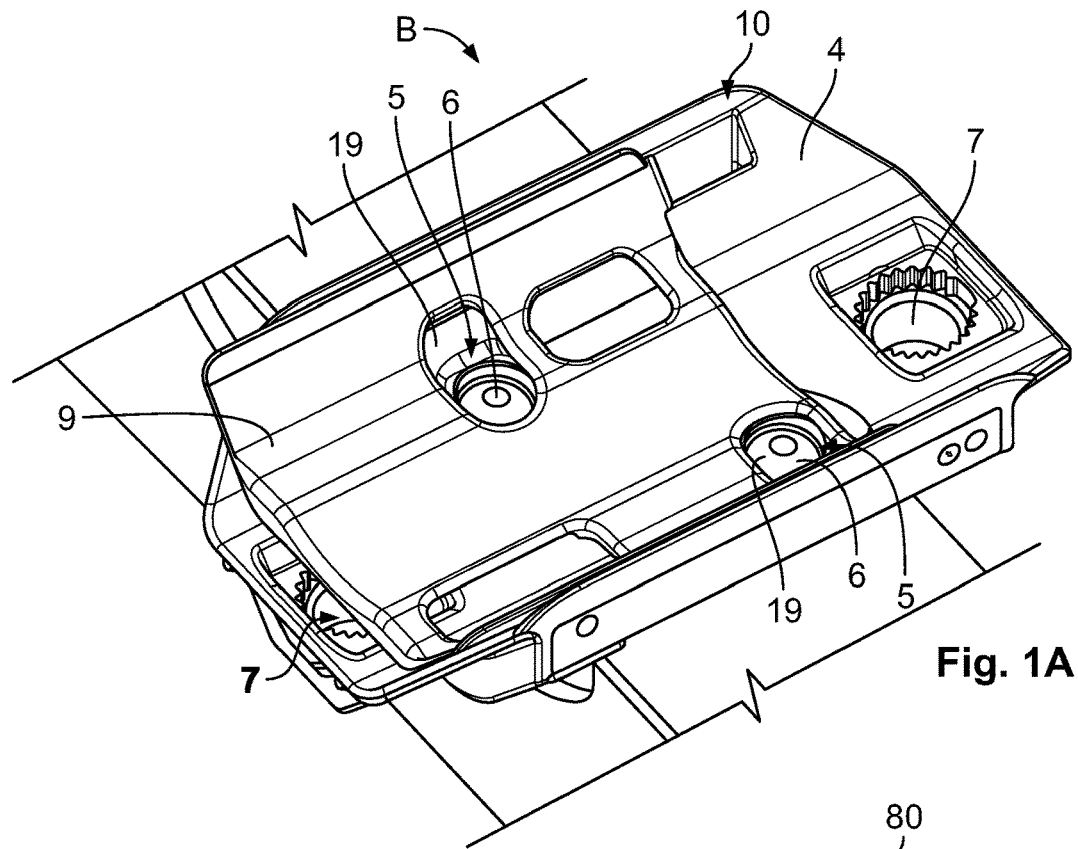
FIG. 1A is a perspective view of a mounting assembly according to an embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

A mounting assembly 1 according to an embodiment is shown in FIGS. 1A-10. As shown in FIG. 1A-1C, a cable 2 is mounted to an electrically conductive structure 3 using the mounting assembly 1. In an embodiment, the electrically conductive structure 3 is located in a fuselage of an airplane. In order to protect the structure 3 from arcing or short-circuits in the event that cable 2 is damaged, the mounting assembly 1, as described in greater detail below, is designed such that no direct path is available between the cable 2 and a plurality of mounting elements 6 in the mounted position shown in FIG. 1C.

Figure 1B:
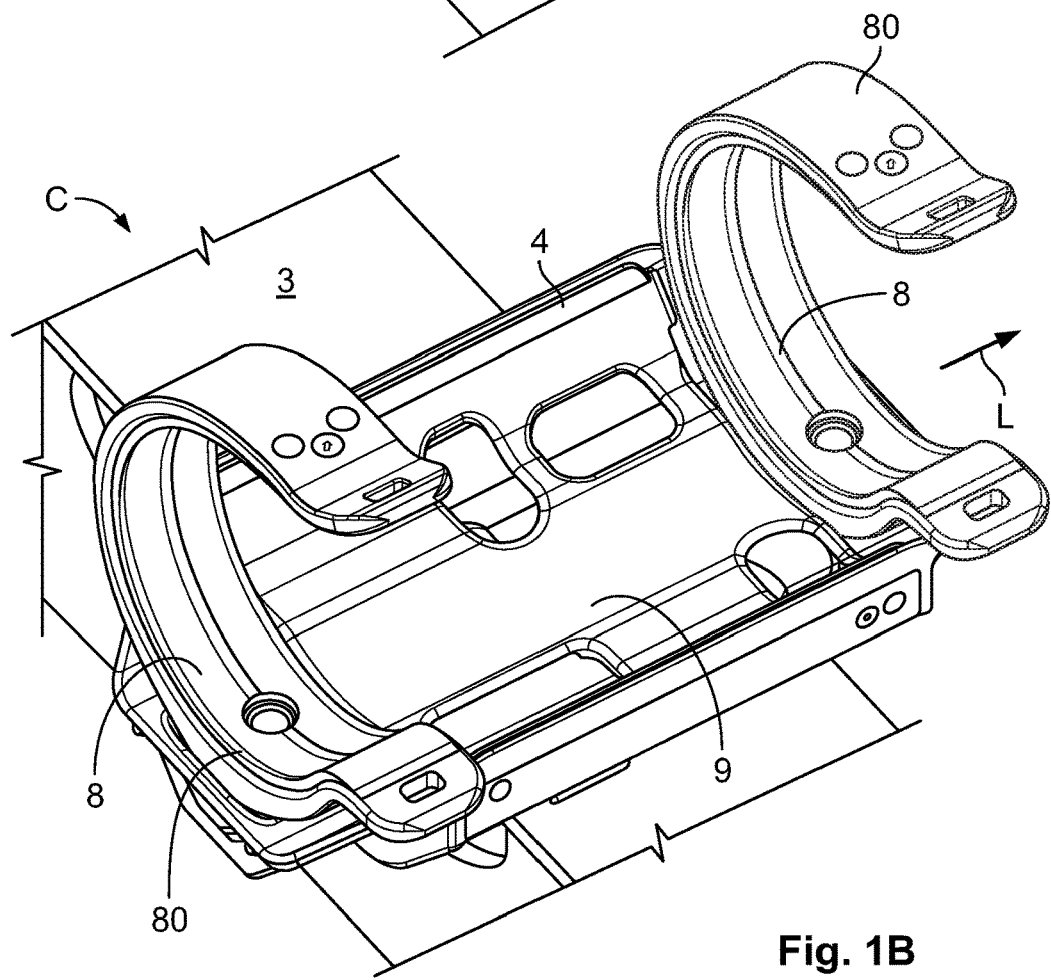
FIG. 1B is a perspective view of the mounting assembly of FIG. 1A with a plurality of cable holding devices.
Figure 1C:
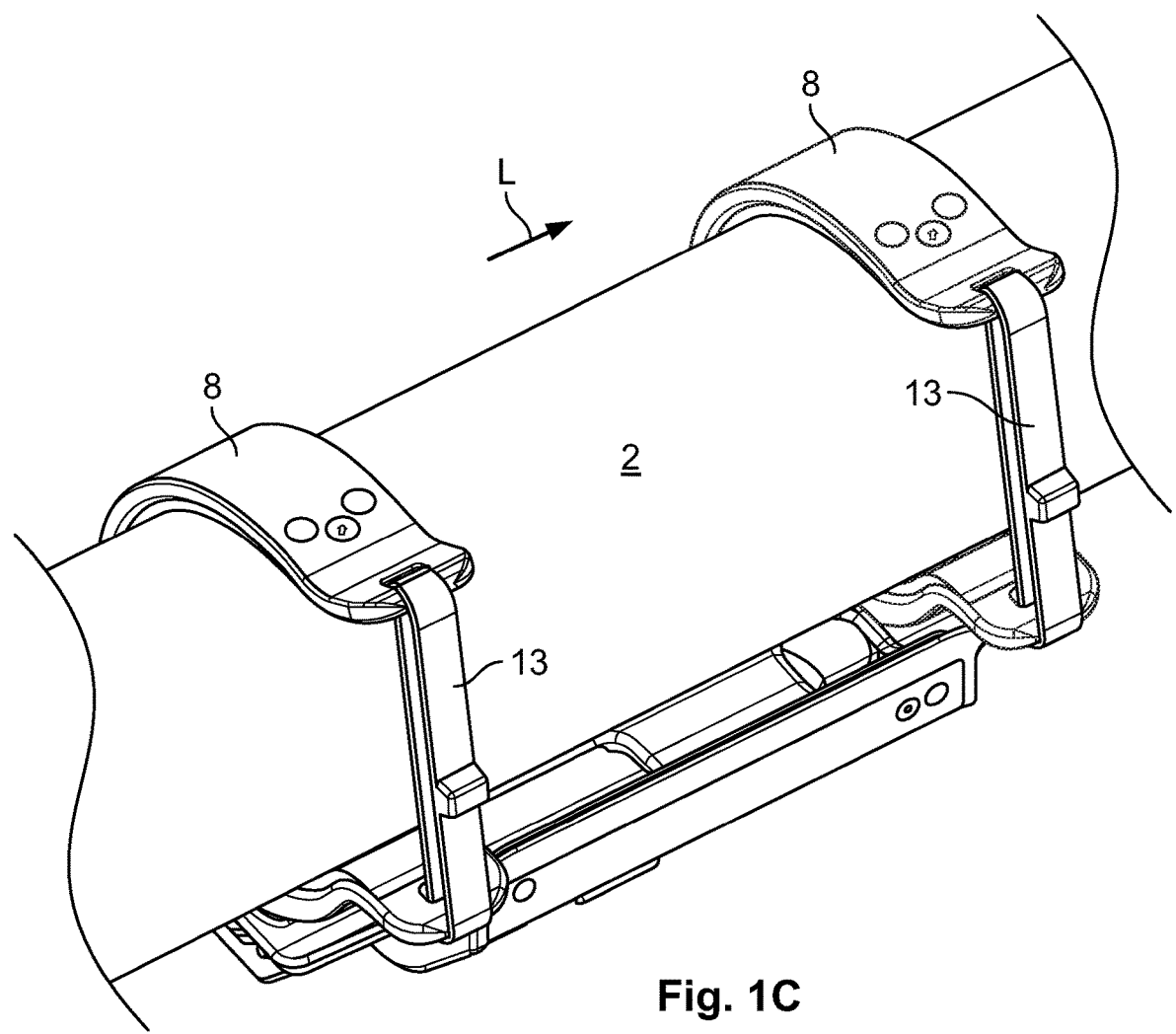
FIG. 1C is a perspective view of the mounting assembly of FIG. 1B attached to a cable.
Figure 3A:
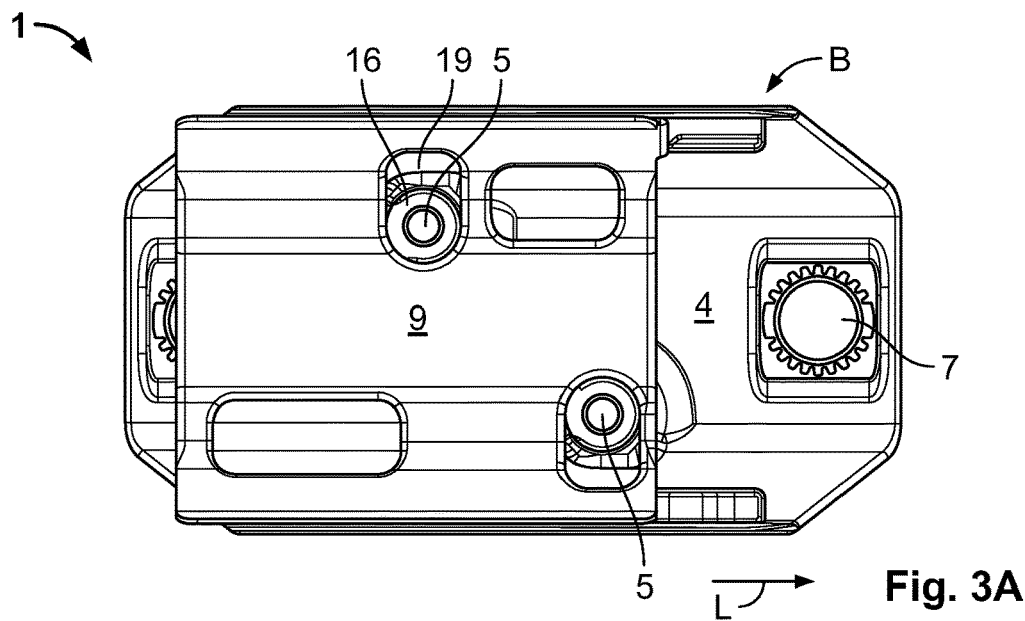
FIG. 3A is a top view of the mounting assembly of FIG. 1A in a bracket mounting position.
Figure 3B:
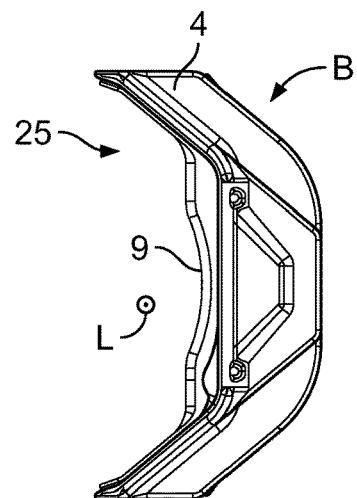
FIG. 3B is an end view of the mounting assembly of FIG. 1A in the bracket mounting position.
Figure 3C:
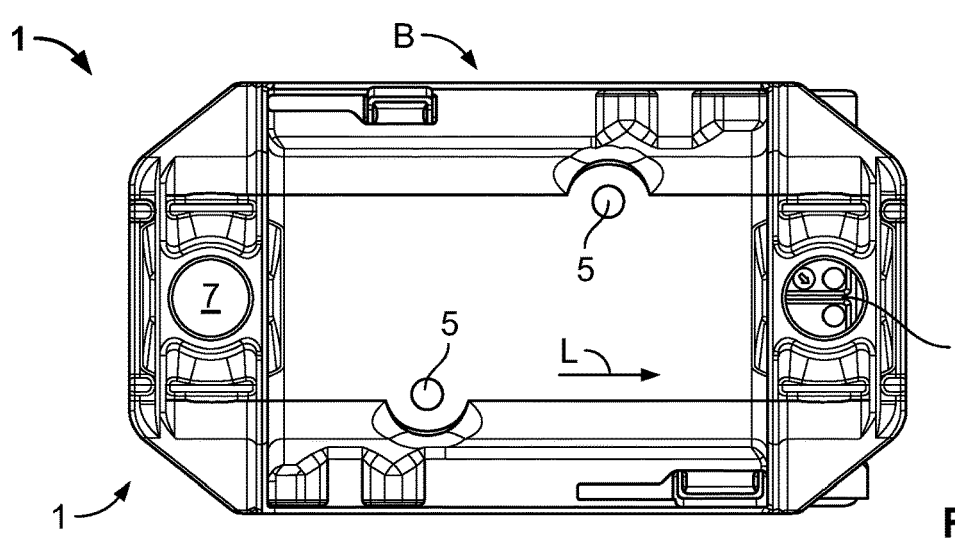
FIG. 3C is a bottom view of the mounting assembly of FIG. 1A in the bracket mounting position.
Figure 3D:
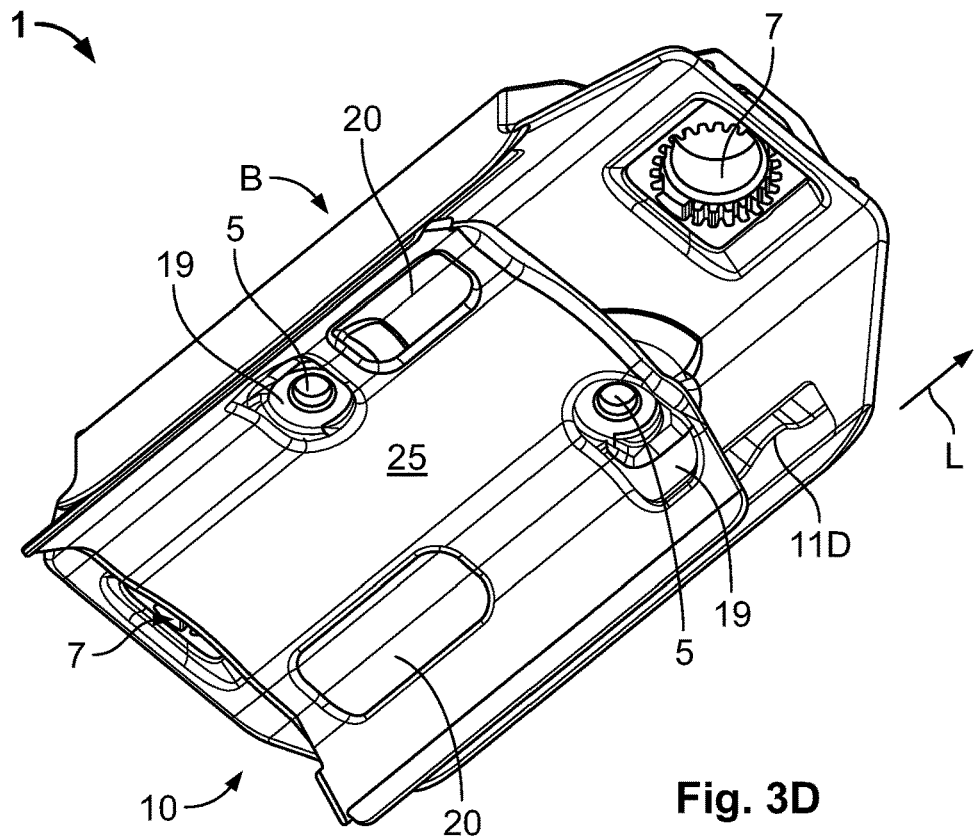
FIG. 3D is a top perspective view of the mounting assembly of FIG. 1A in the bracket mounting position.
Figure 3E:
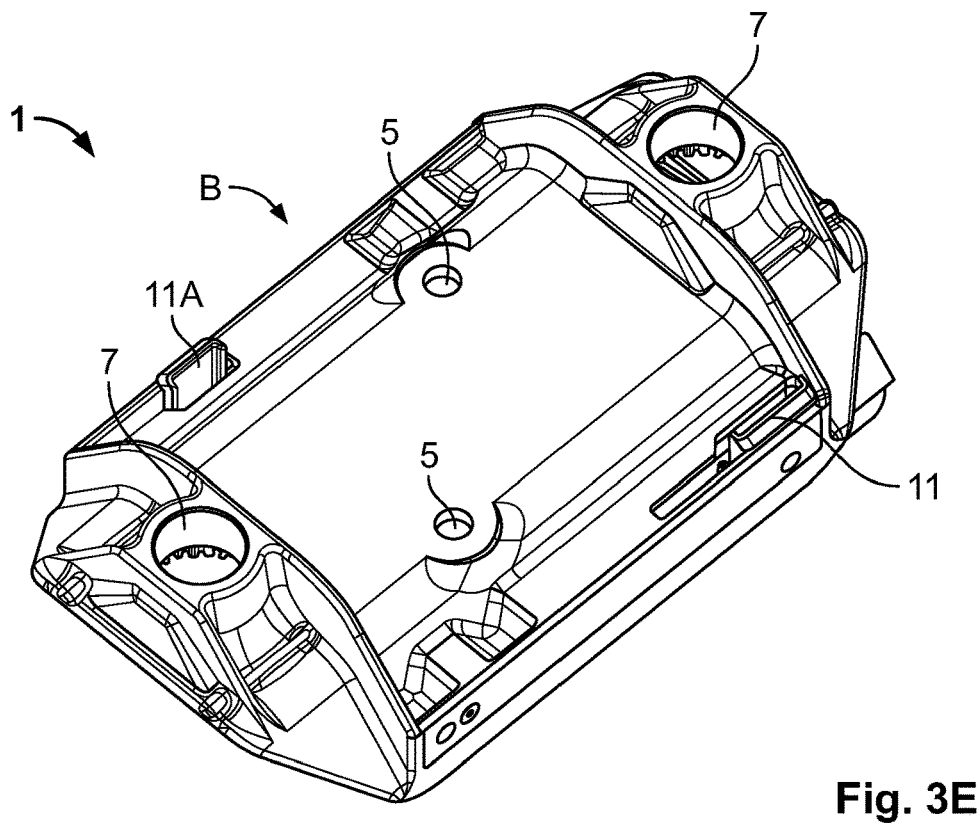
FIG. 3E is a bottom perspective view of the mounting assembly of FIG. 1A in the bracket mounting position.
Figure 4A:
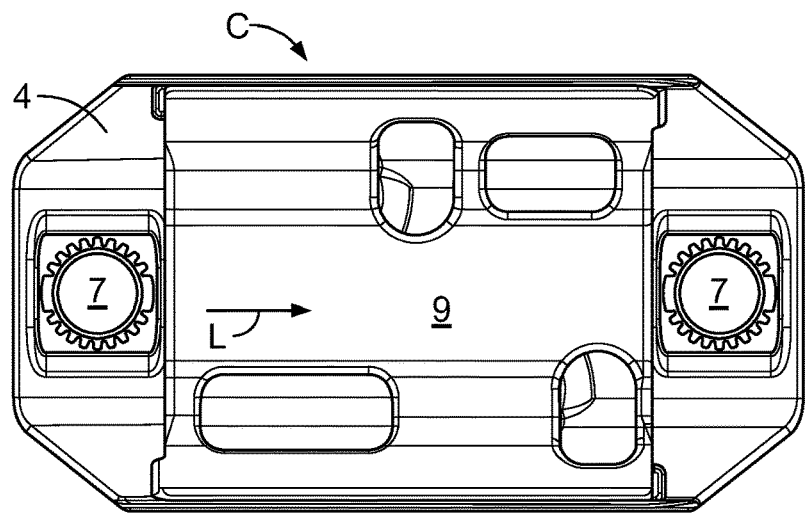
FIG. 4A is a top view of the mounting assembly of FIG. 1A in a cable mounting position.
Figure 4B:
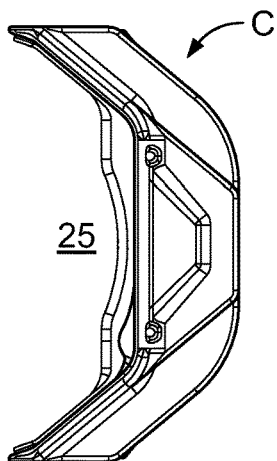
FIG. 4B is an end view of the mounting assembly of FIG. 1A in the cable mounting position.
Figure 4C:
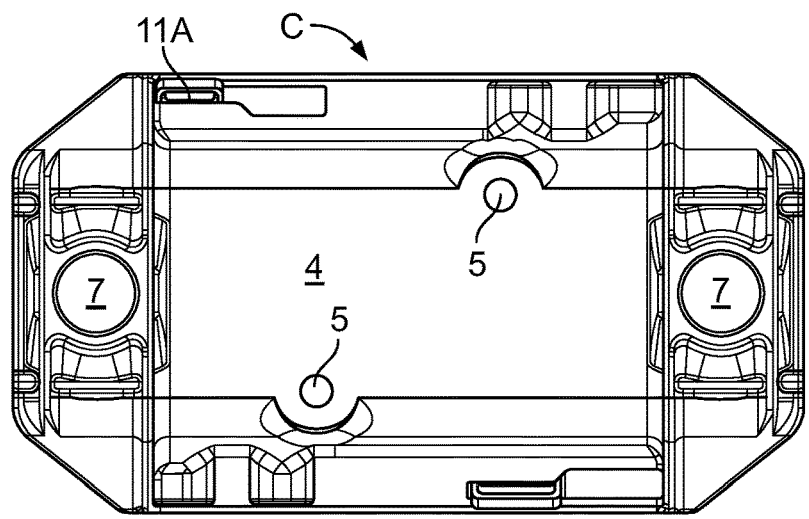
FIG. 4C is a bottom view of the mounting assembly of FIG. 1A in the cable mounting position.
Figure 4D:
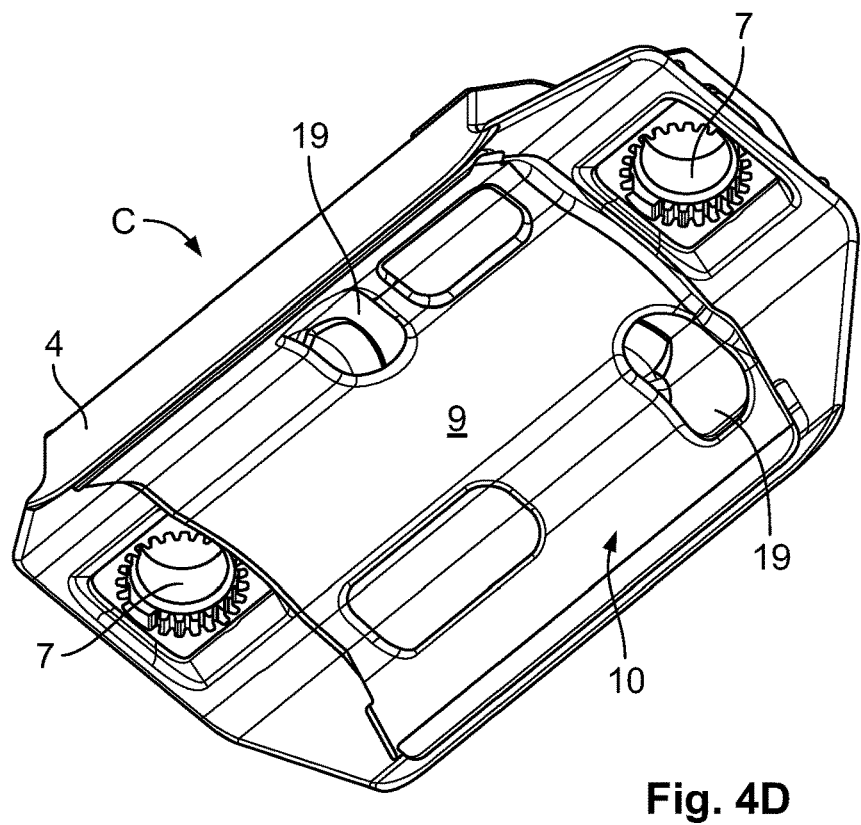
FIG. 4D is a top perspective view of the mounting assembly of FIG. 1A in the cable mounting position.
Figure 4E:
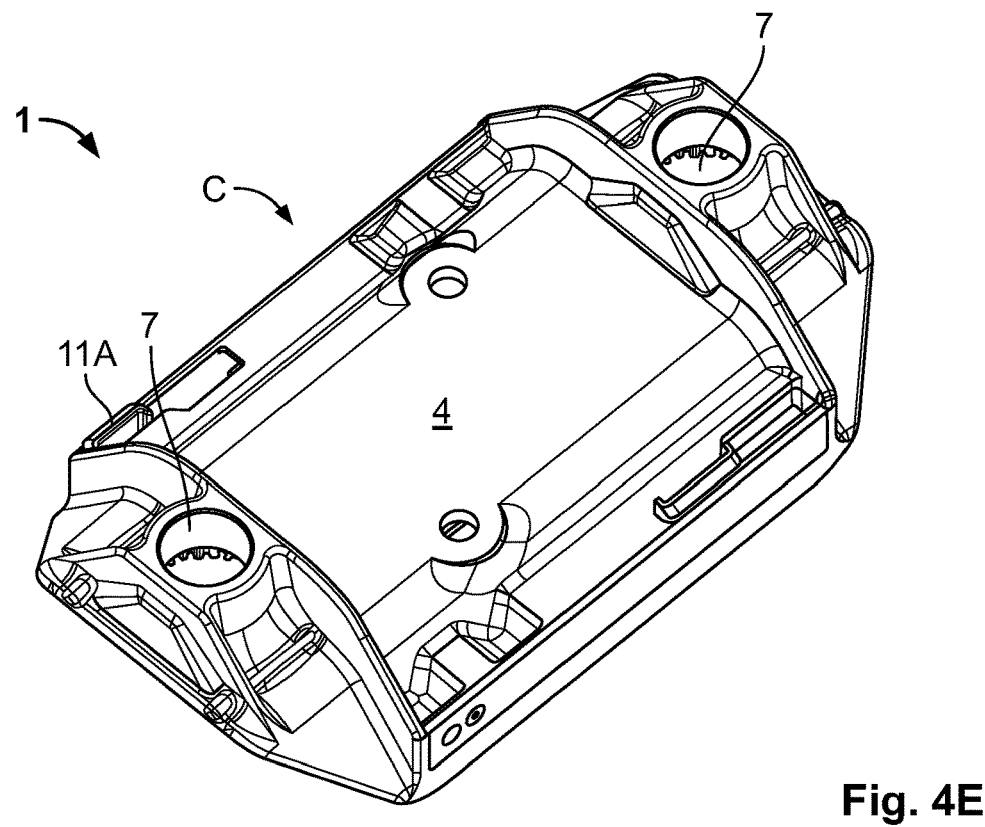
FIG. 4E is a bottom perspective view of the mounting assembly of FIG. 1A in the cable mounting position.

The mounting assembly 1, as shown in FIGS. 1A-1C, includes a mounting bracket 4, a cable holding device 8 attached to the mounting bracket 4 and adapted to hold the cable 2, and a cover 9 mounted on the mounting bracket 4 and movable with respect to the mounting bracket 4. The mounting bracket 4, as shown in FIG. 1A, includes a plurality of mounting element receptacles 5 and a plurality of cable holding device receptacles 7. In an embodiment, the mounting bracket 4 and the cover 9 are made of an insulating material such as plastic and are produced by injection molding. In an embodiment, the cover 9 has a U-shaped or a C-shaped cross-section to limit movement of the sides.

The mounting assembly 1 is shown in a bracket mounting position B in FIG. 1A. The mounting bracket 4 is mounted to the electrically conductive structure 3 via the plurality of mounting elements 6 inserted into the mounting element receptacles 5 in the bracket 4. Such a mounting is possible due to access holes 19 in a cover 9 of the mounting assembly 1 through which access to the mounting element receptacles 5 is possible in the bracket mounting position B from a cover side 10 of the mounting bracket 4. To prevent a mounting of the cable holding devices 8, which are designed as cable clips 80, one of a plurality of cable holding device receptacles 7 is covered by the cover 9 in the bracket mounting position B so that access to this cable holding device receptacle 7 is not possible.

Once the bracket 4 is mounted to the electrically conductive structure 3, the cover 9 is slid relative to the mounting bracket 4 from the bracket mounting position B shown in FIG. 1A to a cable mounting position C shown in FIG. 1B. In the cable mounting position C, the cover 9 covers the mounting element receptacles 5 and the mounting elements 6 located therein. In the cable mounting position C, both cable holding device receptacles 7 are accessible. In FIG. 1B the cable holding devices 8 are already inserted in the cable holding device receptacles 7 and attached to the bracket 4.

In the cable mounting position C, shown in FIG. 1B, one of the cable holding devices 8 blocks a movement of the cover 9 from the cable mounting position C back to the bracket mounting position B. Thus, the mounting element receptacles 5 and the mounting elements 6 located therein are only accessible when no cable 2 is attached. Once the cable holding devices 8 are mounted, the cable 2 is inserted into the cable holding devices 8. The cable holding devices 8 are then closed with cable ties 13 as shown in FIG. 1C. The cable 2 is then fixed within the cable holding devices 8. In the shown embodiment, the mounting assembly 1 is connected to a single cable 2. In other embodiments, the mounting assembly 1 can be used with two or more cables 2 or a bundle of cables 2.

In the shown embodiment, the mounting bracket 4 has only two mounting element receptacles 5. In other embodiments, the mounting bracket 4 could also have more than 2 mounting element receptacles 5. For example, it could have two pairs of mounting element receptacles 5 wherein each pair is adapted for mounting to a specific location on the electrically conductive structure 3. In this case, different covers 9 could be used for different mounting situations. The cover 9 would then only have to provide access to the mounting element receptacles 5 that are actually used for the corresponding mounting situation. Other mounting element receptacles 5 could be covered. This could, for example, prevent an incorrect mounting from occurring.

The mounting bracket 4 has two cable holding device receptacles 7 in the shown embodiment. In other embodiments, the mounting bracket 4 can, for example, also have more than two cable holding device receptacles 7, for example, two pairs of cable holding device receptacles 7 for different cable holding devices 8.

The mounting assembly 1 is shown in FIGS. 2A and 2B in a pre-mounting position prior to assembly into the bracket mounting position B shown in FIG. 1A. To come to the bracket mounting position B, the cover 9 is clipped to the mounting bracket 4. The mounting bracket 4 and the cover 9 are then held together by latches 11B on the cover 9 that engage with corresponding surfaces on the mounting bracket 4.

The latches 11B, as shown in FIGS. 2A and 2B, are part of a guiding device 11 for guiding the cover 9 relative to the mounting bracket 4. The guiding device 11 allows a linear movement of the cover 9 relative to the mounting bracket 4. The guiding device 11 further comprises tabs 11A to guide the movement of the two parts. The tabs 11A have a rounded lower part that allows a smooth movement. When moving from the bracket mounting position B to the cable mounting position C, the tabs 11A have to move over protrusions 11C and come to rest in troughs 11D. Once the tabs 11A are in the troughs 11D, the mounting assembly 1 is at least preliminarily held in the cable mounting position C.

Each mounting element receptacle 5 of the mounting bracket 4, as shown in FIGS. 2A and 2B, is a through-hole 15 and comprises in an upper part an extended head space 16 that is expanded relative to a lower part of the mounting element receptacle 5 and that receives a head of a mounting element 6, such as a bolt, a screw or a rivet. The cable holding device receptacles 7 are also through-holes 17. In the shown embodiment, the cable holding device receptacles 7 are designed as sockets 70 for cable clips 80 and have in their top parts teethed circumferences that block a rotation of the cable clips 80.

As shown in FIGS. 2A and 2B, the cover 9 has weight reduction holes 20 which reduce a weight without sacrificing stability. The weight reduction holes 20 can also serve as receptacles for fingers or tools when the mounting assembly 1 is moved from the bracket mounting position B to the cable mounting position C or back. The cover 9 defines a trough or a channel 25 for the cable 2. The cable 2 is thus held parallel to a longitudinal direction L.

The mounting assembly 1 is shown in the bracket mounting position B in FIGS. 3A-3E. All the mounting element receptacles 5 are accessible and only one cable holding device receptacle 7 is covered in the bracket mounting position B. In other embodiments, all cable holding device receptacles 7 could be covered in the bracket mounting position B to avoid that even a single cable holding device 8 is attached.

The mounting assembly 1 is shown in the cable mounting position C in FIGS. 4A-4E. The mounting element receptacles 5 are covered and not accessible from a cover side 10. The cable holding devices receptacles 7 are accessible from the cover side 10. In other embodiments that comprise more than two mounting element receptacles 5, all mounting element receptacles 5 are covered in the cable mounting position C, even including the ones that are not used. Similarly, if the mounting assembly 1 comprises more than two cable holding device receptacles 7, only the ones that are needed in the current mounting situation can be accessible, for example, in order to avoid a potentially dangerous incorrect assembly. Different covers 9 can be used for different mounting situations. However, to keep the number of variants low, only a single cover 9 can be used that can for example, grant access to all the cable holding device receptacles 7 in the cable mounting position C.

The mounting assembly 1 is shown in the bracket mounting position B in FIGS. 5A and 5B. As shown in FIG. 5B, the mounting element 6 is a rivet in the shown embodiment and is used to attach the mounting assembly 1 to the electrically conductive structure 3. As shown in FIGS. 5C and 5D, with the mounting assembly 1 in the cable mounting position C, the cover 9 blocks access to the rivet 6 from the cover side 10.

Figure 6B:
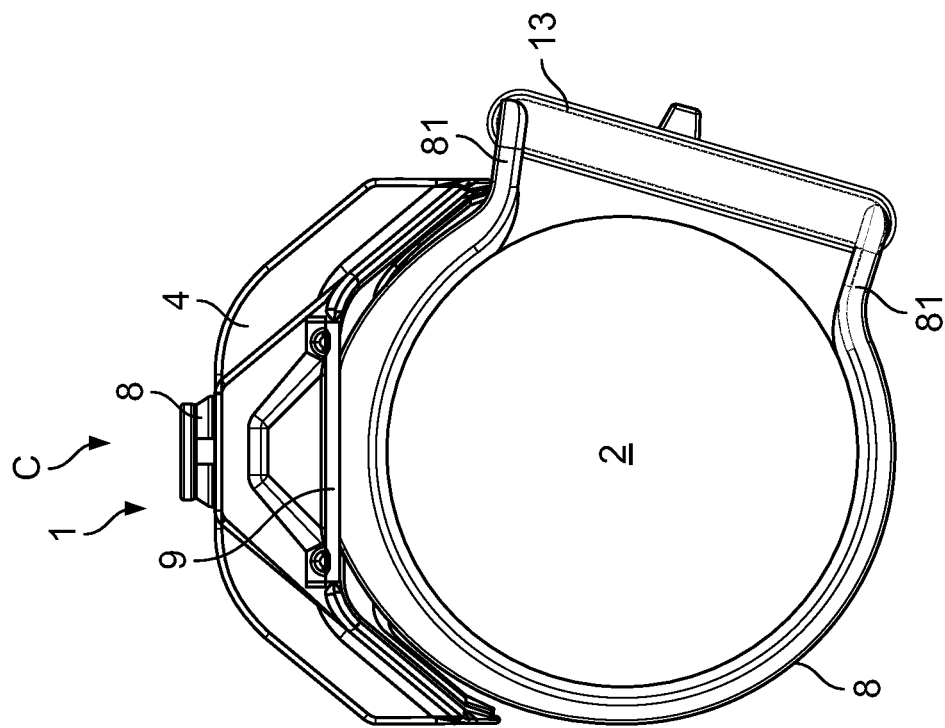
FIG. 6B is a side view of the mounting assembly of FIG. 1B with the cable holding device and a cable tie.
Figure 6A:
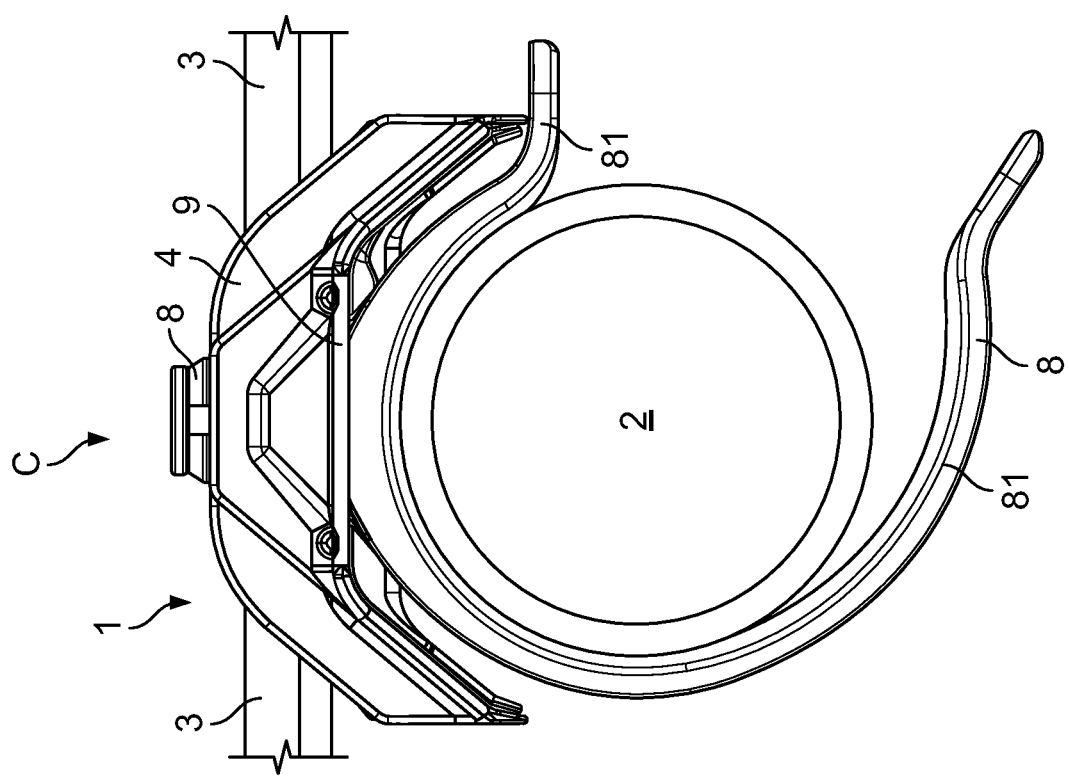
FIG. 6A is a side view of the mounting assembly of FIG. 1B with the cable holding device.
Figure 7:
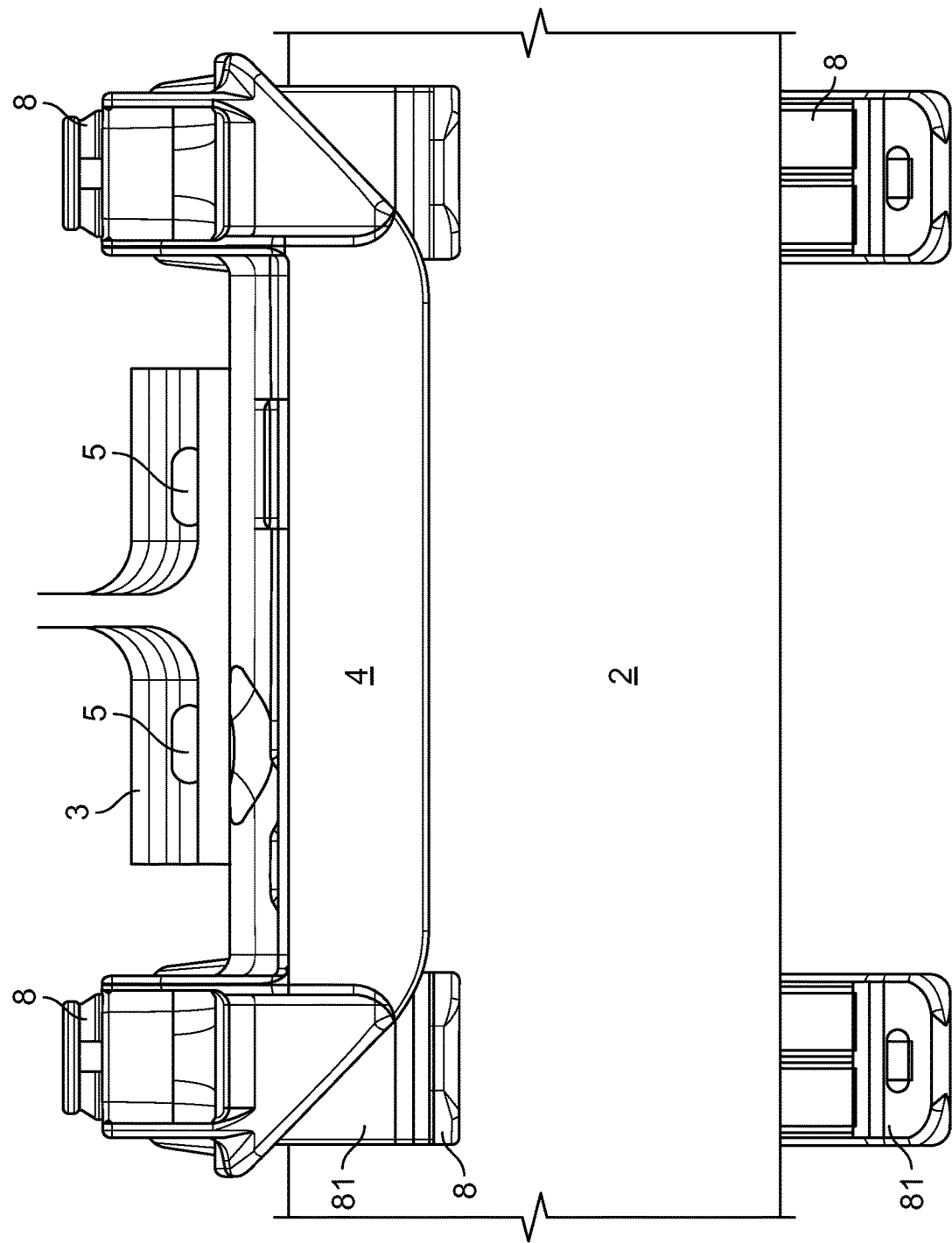
FIG. 7 is a front view of the mounting assembly of FIG. 6A.
Figure 8A:
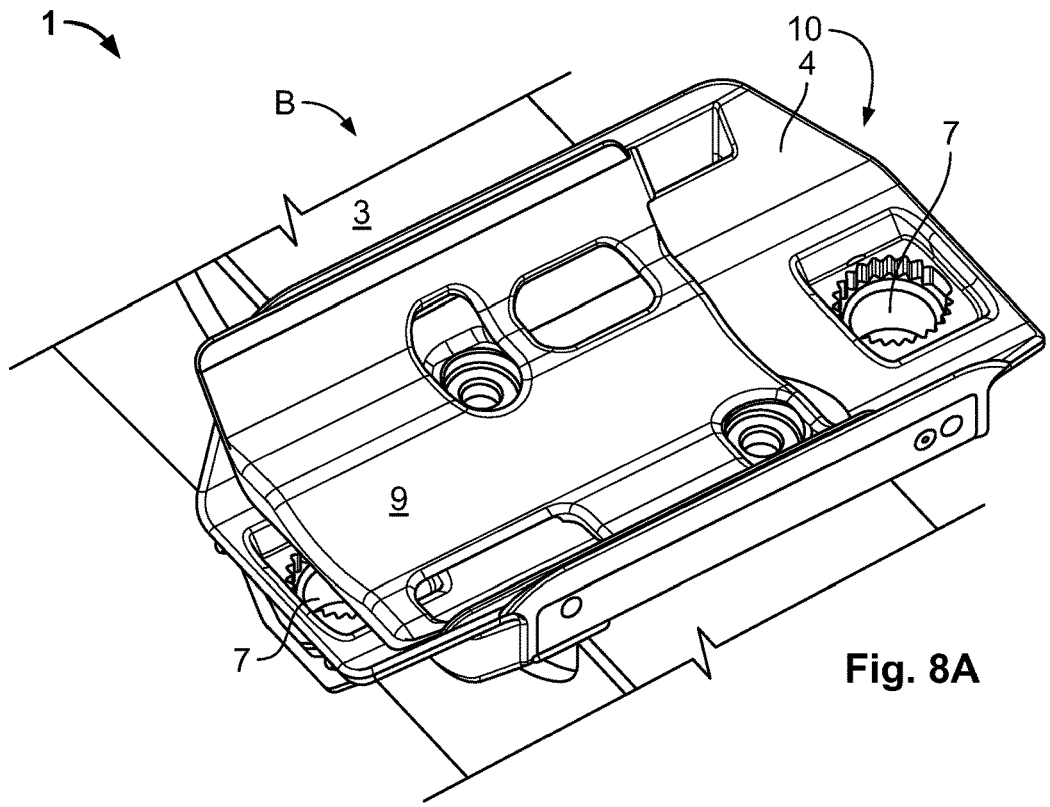
FIG. 8A is a perspective view of the mounting assembly of FIG. 1A.
Figure 8B:
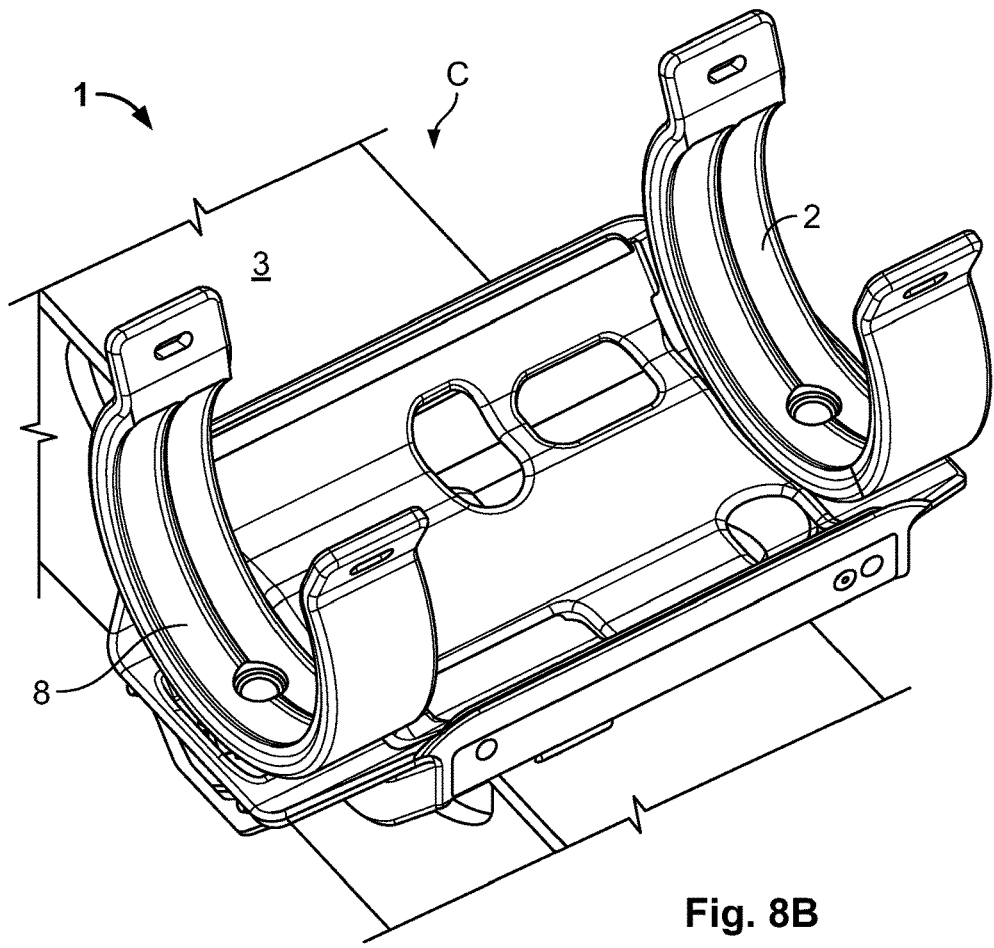
FIG. 8B is a perspective view of the mounting assembly of FIG. 1A with a cable holding device according to another embodiment.
Figure 8C:
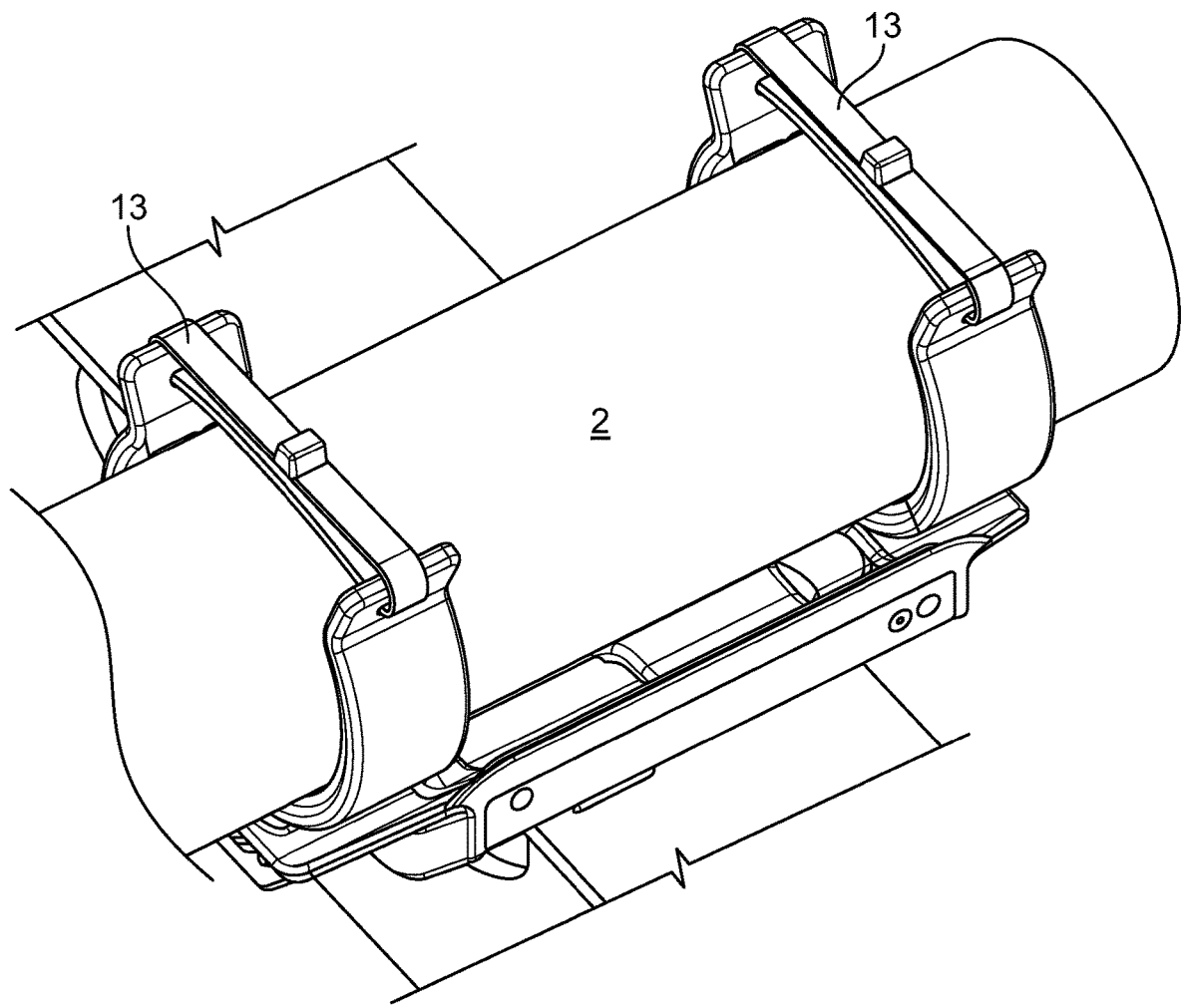
FIG. 8C is a perspective view of the mounting assembly of FIG. 8B with the cable holding device and a cable tie.
Figure 9:
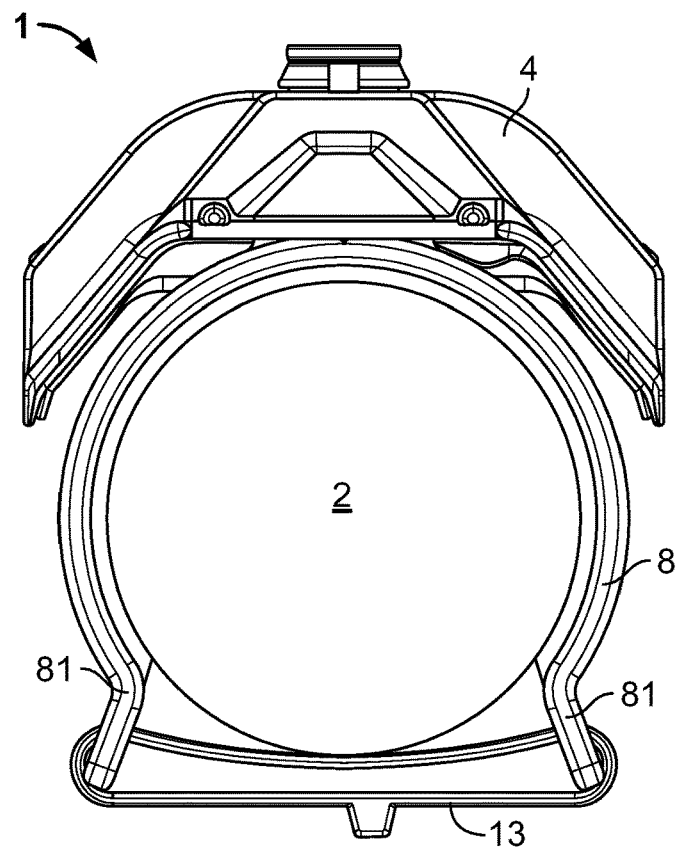
FIG. 9 is an end view of the mounting assembly of FIG. 8C.
Figure 10:
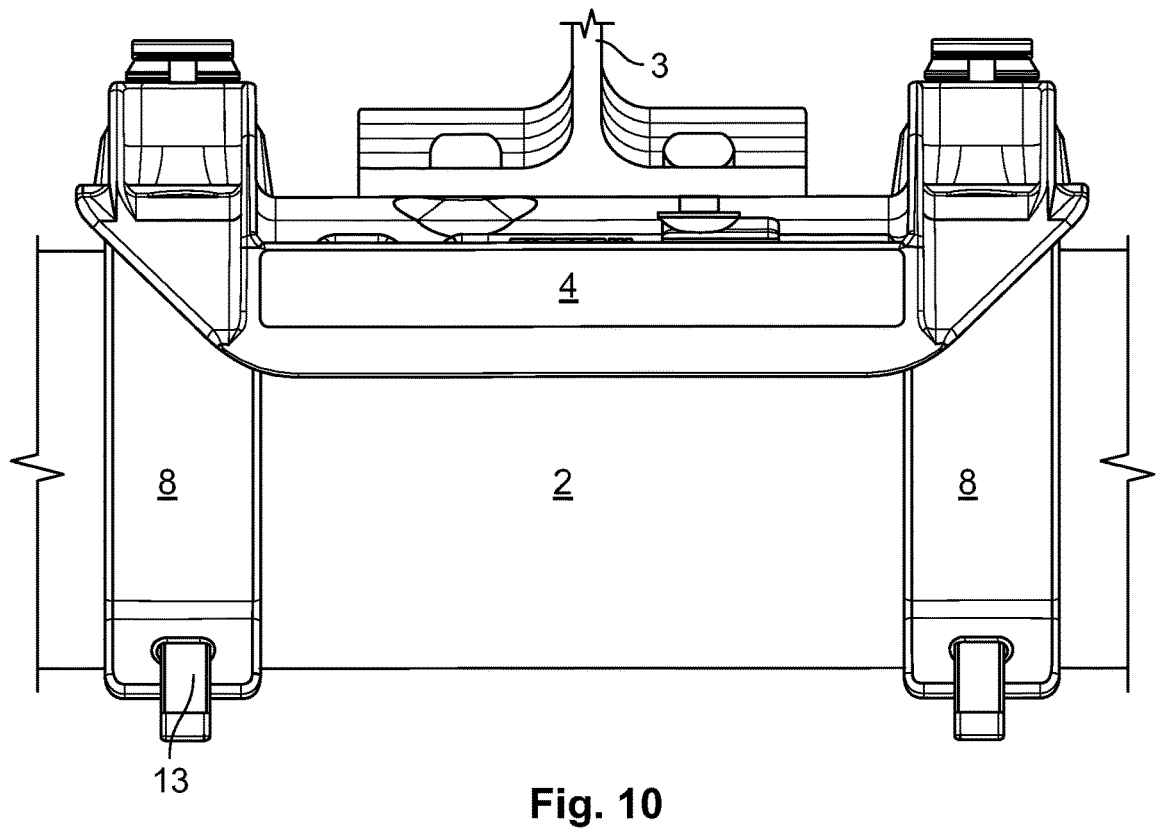
FIG. 10 is a front view of the mounting assembly of FIG. 8C.

The cable holding devices 8 are shown in FIGS. 6A, 6B, and 7. In the shown embodiment, the cable holding devices 8 are cable clips 80 into which the cable 2 can be inserted at right angles to the fixation axis of the cable clip 80. Once the cable 2 or a bundle of cables 2 have successfully been inserted, legs 81 of the cable clips 80 are pulled toward each other by the cable tie 13. The cable clips 80 can accommodate cables 2 of different sizes. A cable clip 80 according to another embodiment used with the mounting assembly 1 is shown in FIGS. 8A-8C, 9, and 10. The cable clip 80 of FIGS. 8A-8C, 9, and 10 is mounted in a position rotated from the embodiment shown in FIGS. 1B and 1C and the two legs 81 are again connected via the cable tie 13.

A mounting assembly 1 according to another embodiment is shown in FIGS. 11A-18. Like reference numbers refer to like elements and only the differences from the embodiment shown in FIGS. 1A-10 will be described in detail.

Figure 11A:
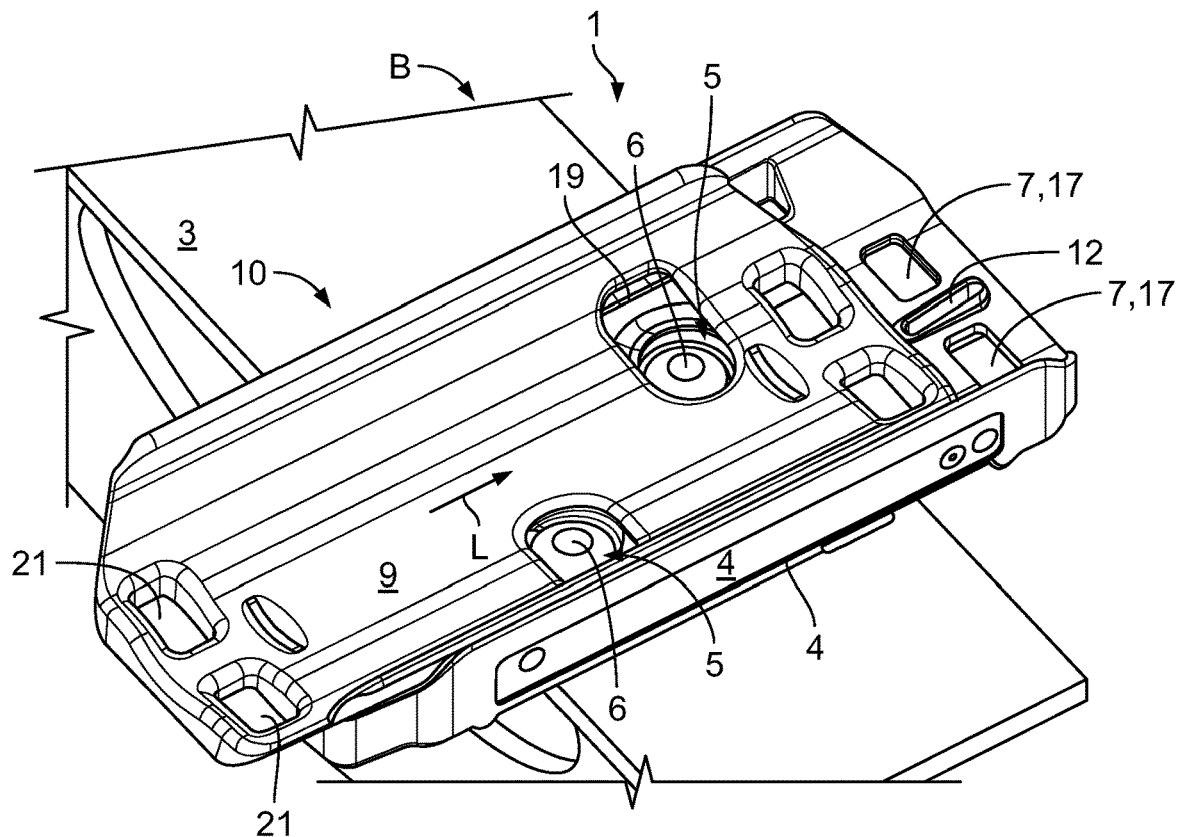
FIG. 11A is a perspective view of a mounting assembly according to another embodiment in a bracket mounting position.
Figure 11B:
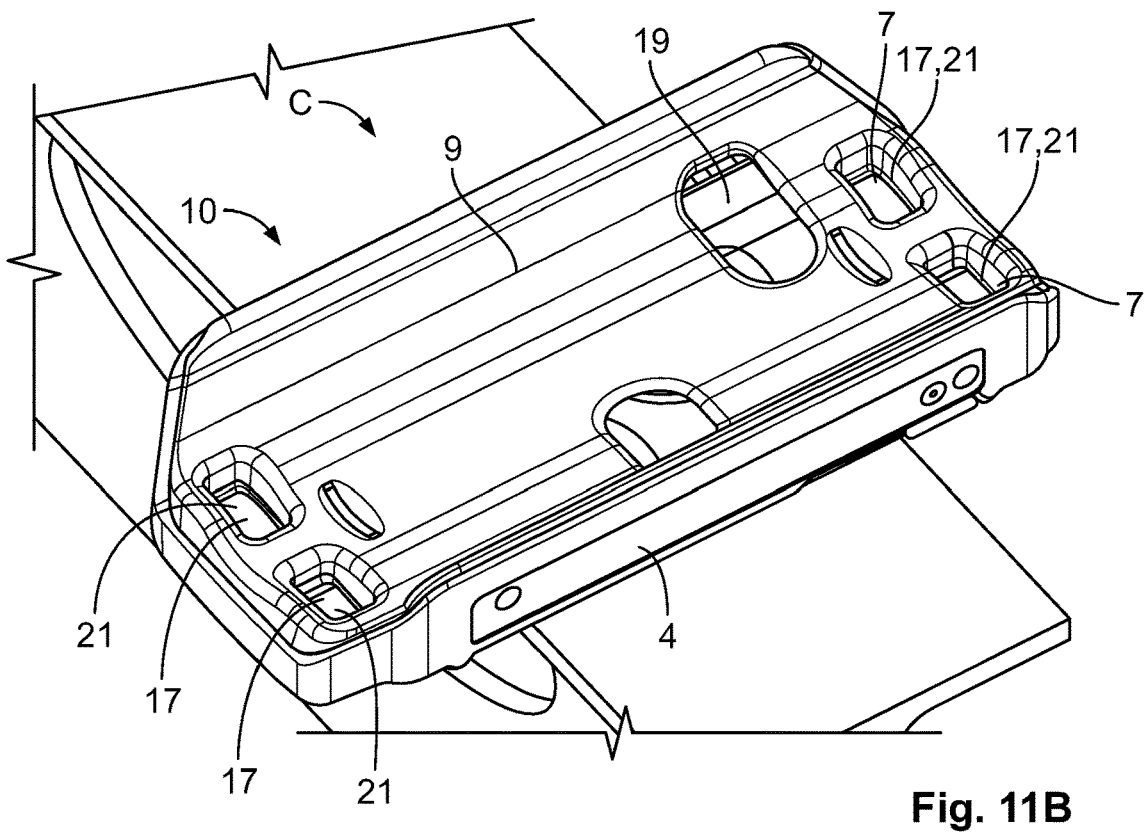
FIG. 11B is a perspective view of the mounting assembly of FIG. 11A in a cable mounting position.

The bracket mounting position B is shown in FIG. 11A and the cable mounting position C is shown in FIG. 11B. In the bracket mounting position B of FIG. 11A, access to the mounting element receptacles 5 is possible. The mounting bracket 4 is already mounted to the electrically conductive structure 3 via mounting elements 6 inserted in the mounting element receptacles 5. Access to these mounting element receptacles 5 is possible through access holes 19 in the cover 9. Once the mounting elements 6 are mounted, the mounting assembly 1 is brought into the cable mounting position C by sliding the cover 9 along a longitudinal direction L linearly relative to the mounting bracket 4. In the cable mounting position C, the mounting element receptacles 5 are covered by the cover 9 and the cable holding device receptacles 7 are accessible from a cover side 10.

As shown in FIG. 11B, in the cable mounting position C, the cable holding device receptacles 7 are aligned with passageways 21 in the cover 9. One pair of cable holding device receptacles 7 is disposed on each side of the mounting assembly 1. A cable tie 13 can then run from the upper side of the mounting assembly 1 to the lower side of the mounting assembly 1 through one cable holding device receptacle 7 and back to the upper side through the other cable holding device receptacle 7. The two passageways 21, 17 of one pair are located at the same length along the longitudinal direction L in which the cable 2 extends.

A kit 100 of the mounting assembly 1, as shown in FIGS. 12A and 12B, includes the mounting bracket 4 and the cover 9. The mounting assembly 1 is in a pre-mounting position in FIGS. 12A and 12B and can be brought into the bracket mounting position B by clipping the cover 9 to the mounting bracket 4. The cover 9 has access holes 19 providing access to the mounting element receptacles 5 in the bracket mounting position B. In other embodiments, access to the mounting element receptacles 5 can, for example, be possible through recesses or cutouts that do not necessarily have to be through-holes. In another embodiment, the provision and blocking of access to a mounting element receptacle 5 can be achieved by sliding an end part of the cover 9 over the mounting element receptacle 5.

The mounting assembly 1, as shown in FIG. 12B, has two latches 12 for retaining the mounting assembly 1 in the cable mounting position C. Each latch 12 has a first part on the mounting bracket 4 with a ramp or a wedge that is inclined relative to the longitudinal direction L and a stop surface at the end of the ramp for interacting with a corresponding stop surface on the cover 9.

Figure 13A:
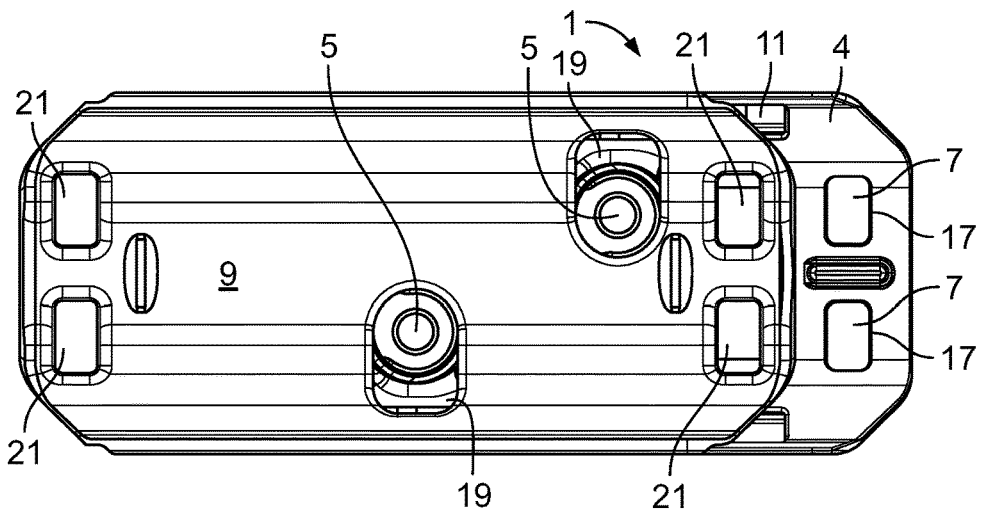
FIG. 13A is a top view of the mounting assembly of FIG. 11A in a bracket mounting position.
Figure 13B:
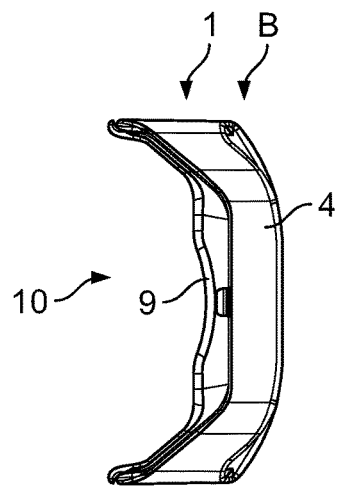
FIG. 13B is an end view of the mounting assembly of FIG. 11A in the bracket mounting position.
Figure 13C:
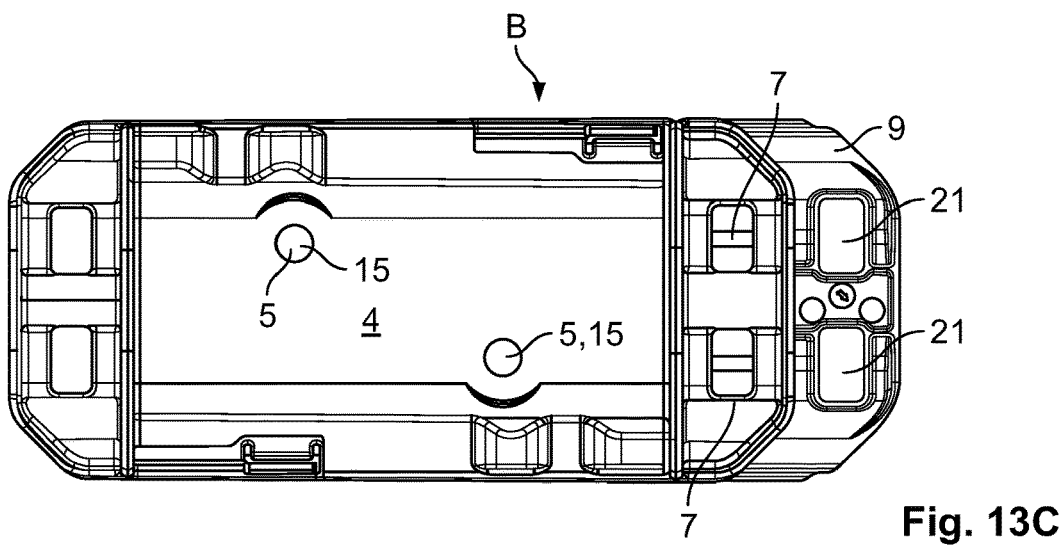
FIG. 13C is a bottom view of the mounting assembly of FIG. 11A in the bracket mounting position.
Figure 13D:
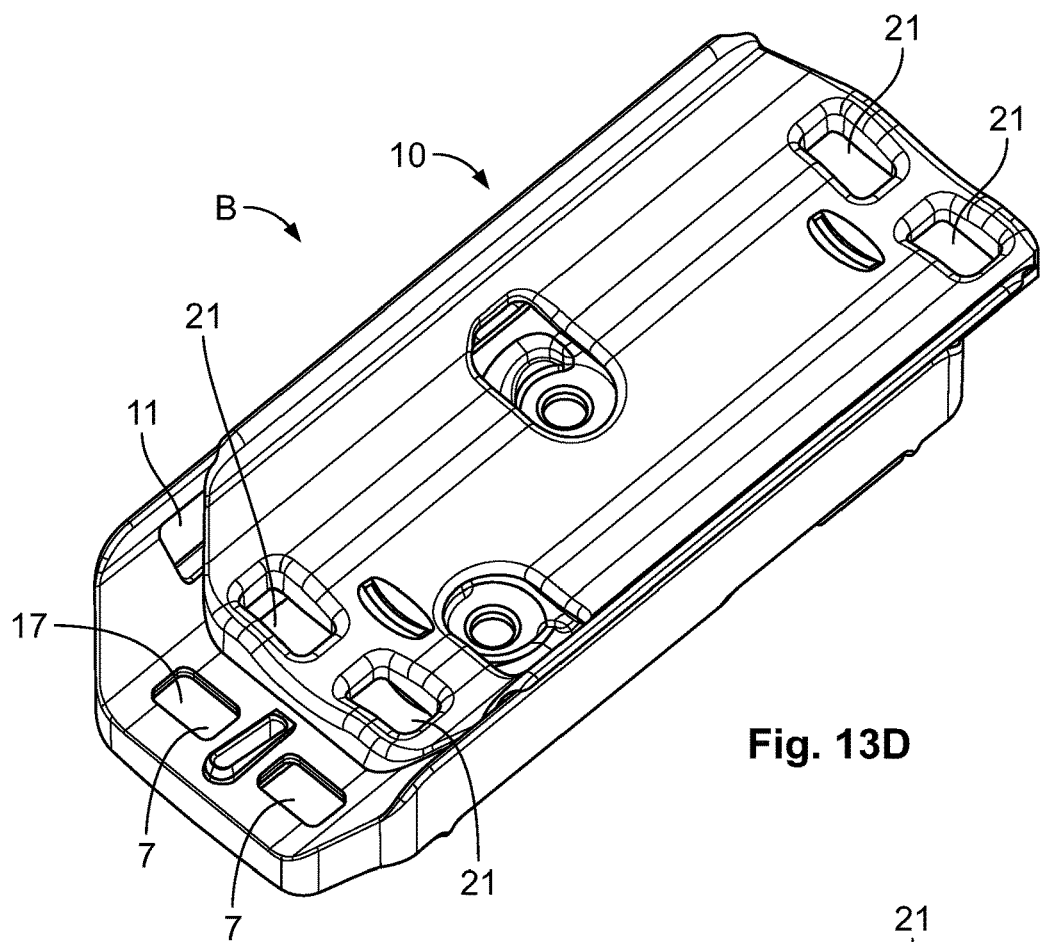
FIG. 13D is a top perspective view of the mounting assembly of FIG. 11A in the bracket mounting position.
Figure 13E:
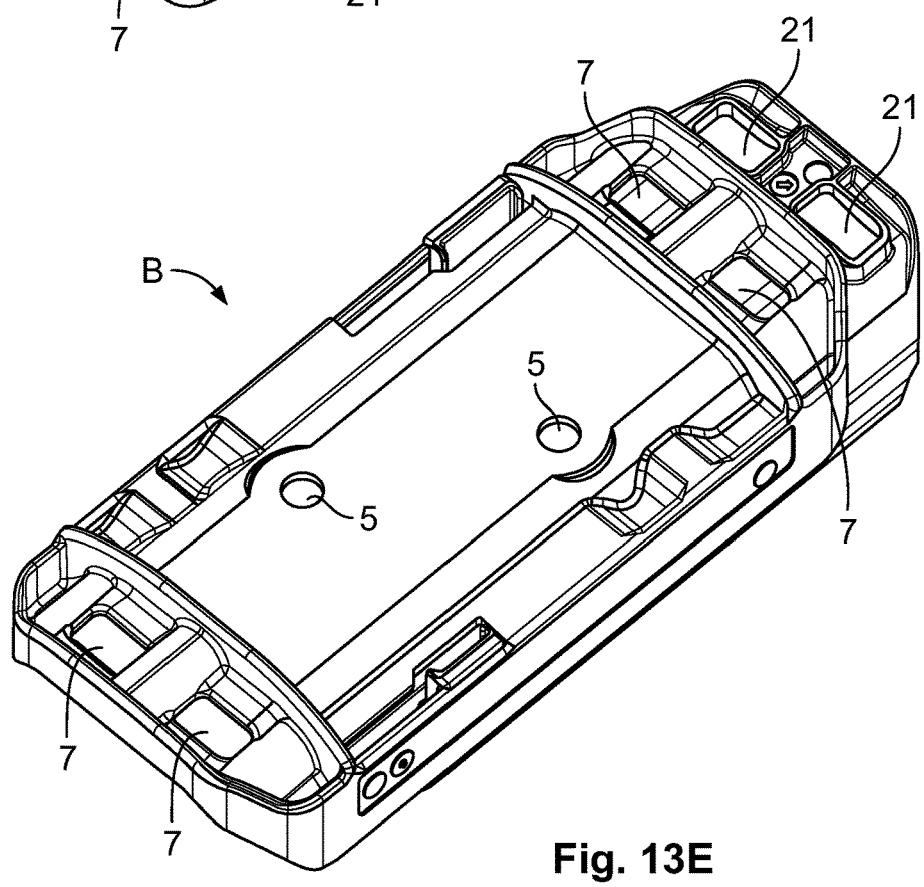
FIG. 13E is a bottom perspective view of the mounting assembly of FIG. 11A in the bracket mounting position.

The mounting assembly 1 is shown in the bracket mounting position B in FIGS. 13A-13E. As shown in FIG. 13C, two of the cable holding device receptacles 7 are covered in the bracket mounting position B by the cover 9 so that no access from the cover side 10 is possible. In another embodiment, the cover 9 could also cover the second pair of cable holding device receptacles 7, for example with a shield-like continuous part that extends further to the right in FIG. 13A. In order to avoid an incorrect mounting of the cable ties 13 to the passageways 21 in the cover 9 in the bracket mounting position B, the mounting bracket 4 could also extend further to the left of FIG. 13A so as to cover the passageways 21.

Figure 14A:
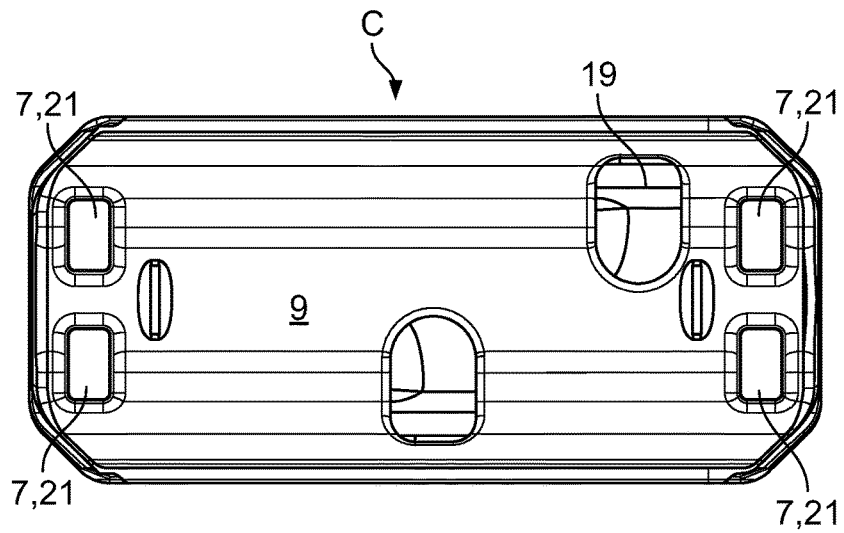
FIG. 14A is a top view of the mounting assembly of FIG. 11A in a cable mounting position.
Figure 14B:
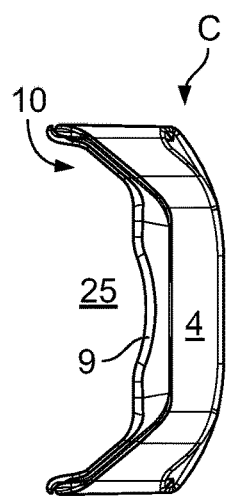
FIG. 14B is an end view of the mounting assembly of FIG. 11A in the cable mounting position.
Figure 14C:
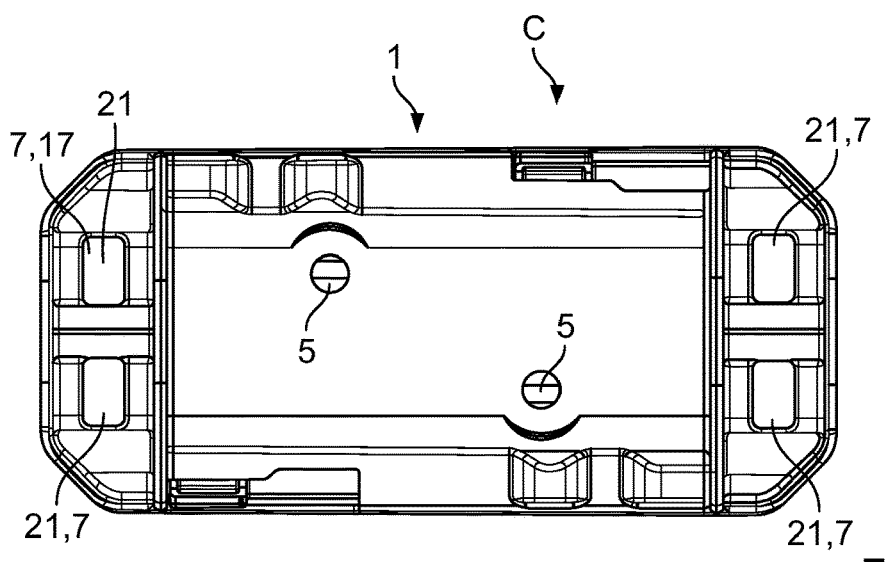
FIG. 14C is a bottom view of the mounting assembly of FIG. 11A in the cable mounting position.
Figure 14D:
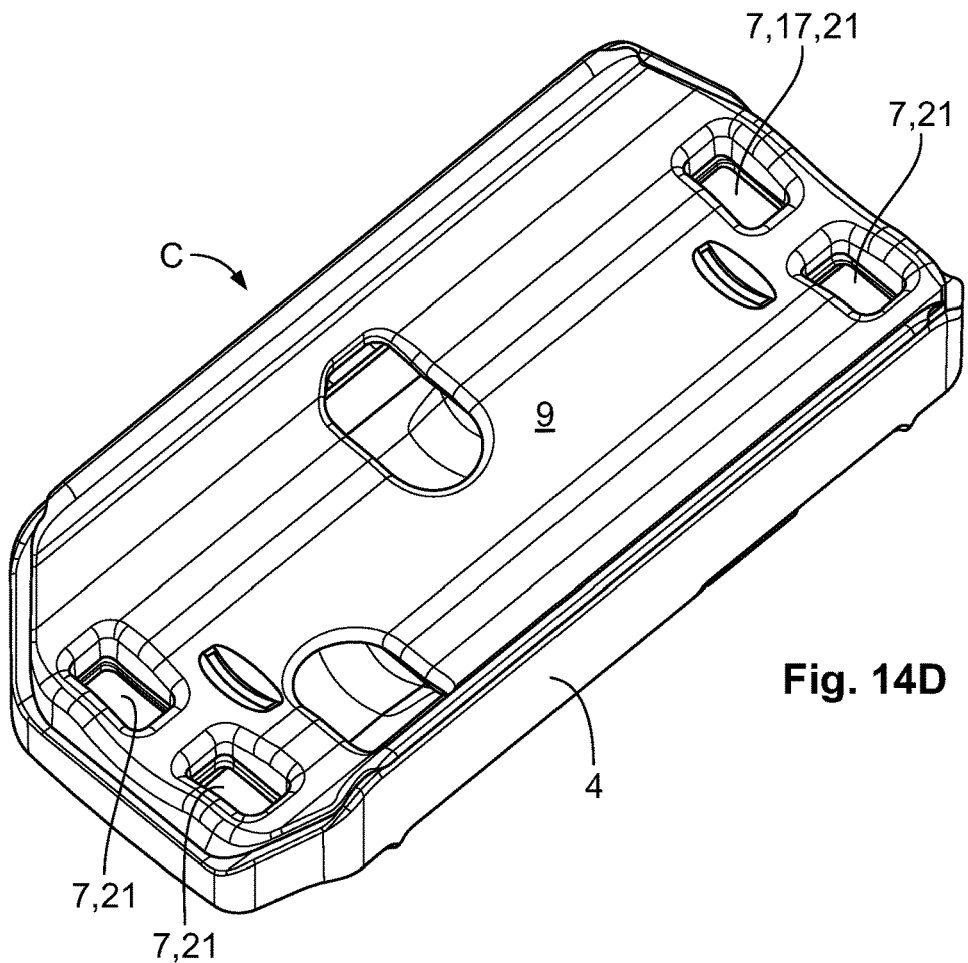
FIG. 14D is a top perspective view of the mounting assembly of FIG. 11A in the cable mounting position.
Figure 14E:
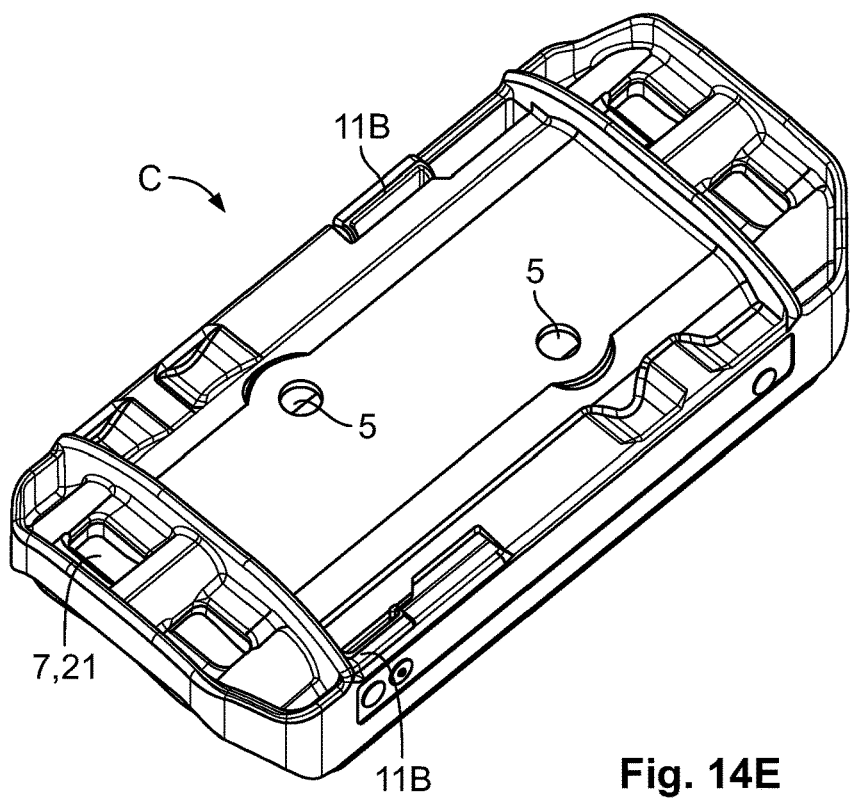
FIG. 14E is a bottom perspective view of the mounting assembly of FIG. 11A in the cable mounting position.

The mounting assembly 1 is shown in the cable mounting position C in FIGS. 14A-14C. The mounting element receptacles 5 are covered by the cover 9 so that they are inaccessible from the cover side 10. The cable holding device receptacles 7 are accessible from the cover side 10.

Similar to the first embodiment of the mounting assembly 1, the second embodiment of the mounting assembly 1 is not restricted to having the number of mounting element receptacles 5 and cable holding device receptacles 7 shown in these figures. There could be more or less of these receptacles 5, 7 which can, in particular, be used for mounting to different locations on the electrically conducting structure 3 or for attaching different types of cable holding devices 8. Again, which cable holding device receptacles 7 and mounting element receptacles 5 are accessible or blocked in the cable mounting position C and in the bracket mounting position B, depends on which of the mounting element receptacles 5 and cable holding device receptacle 7 are actually used in a particular mounting situation.

Figure 16:
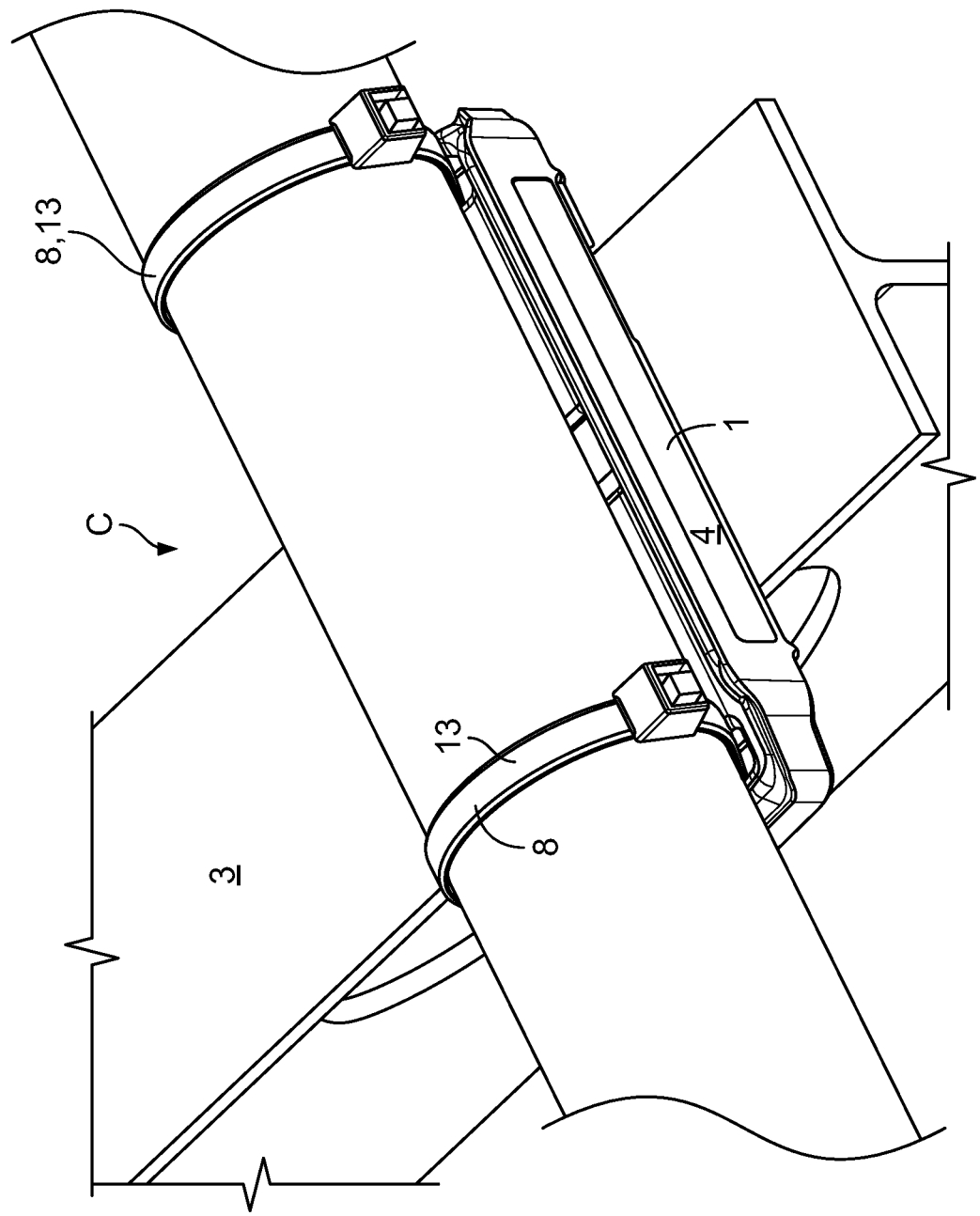
FIG. 16 is a perspective view of the mounting assembly of FIGS. 15A and 15B with a cable.
Figure 17B:
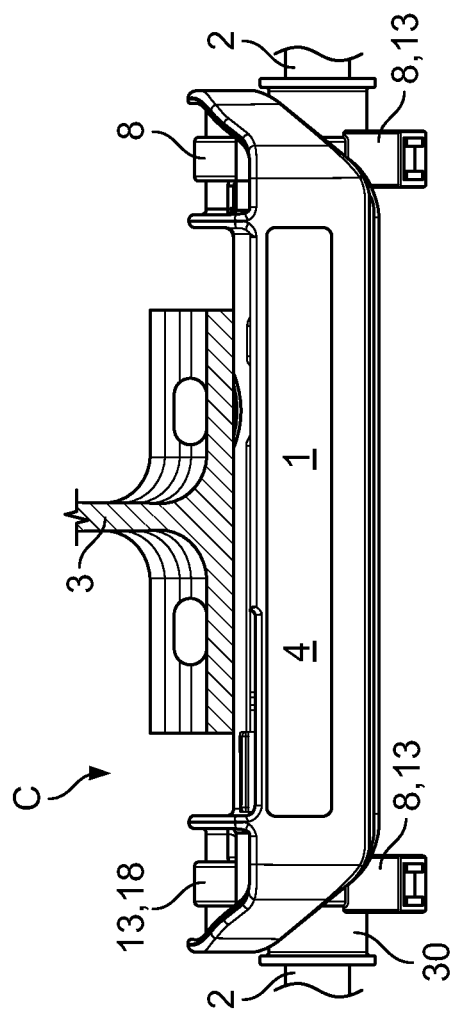
FIG. 17B is a front view of the mounting assembly of FIG. 17A.
Figure 17A:
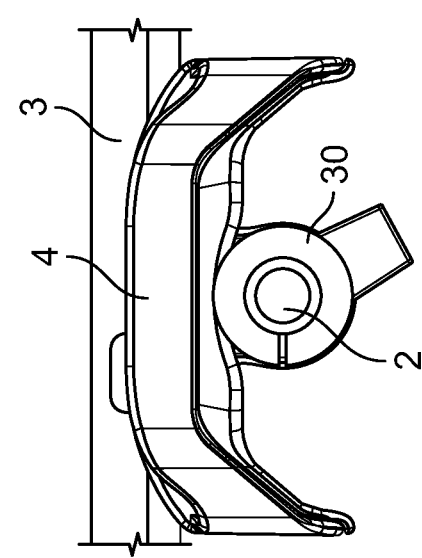
FIG. 17A is an end view of the mounting assembly of FIG. 11A with a cable holding device according to another embodiment.
Figure 18:
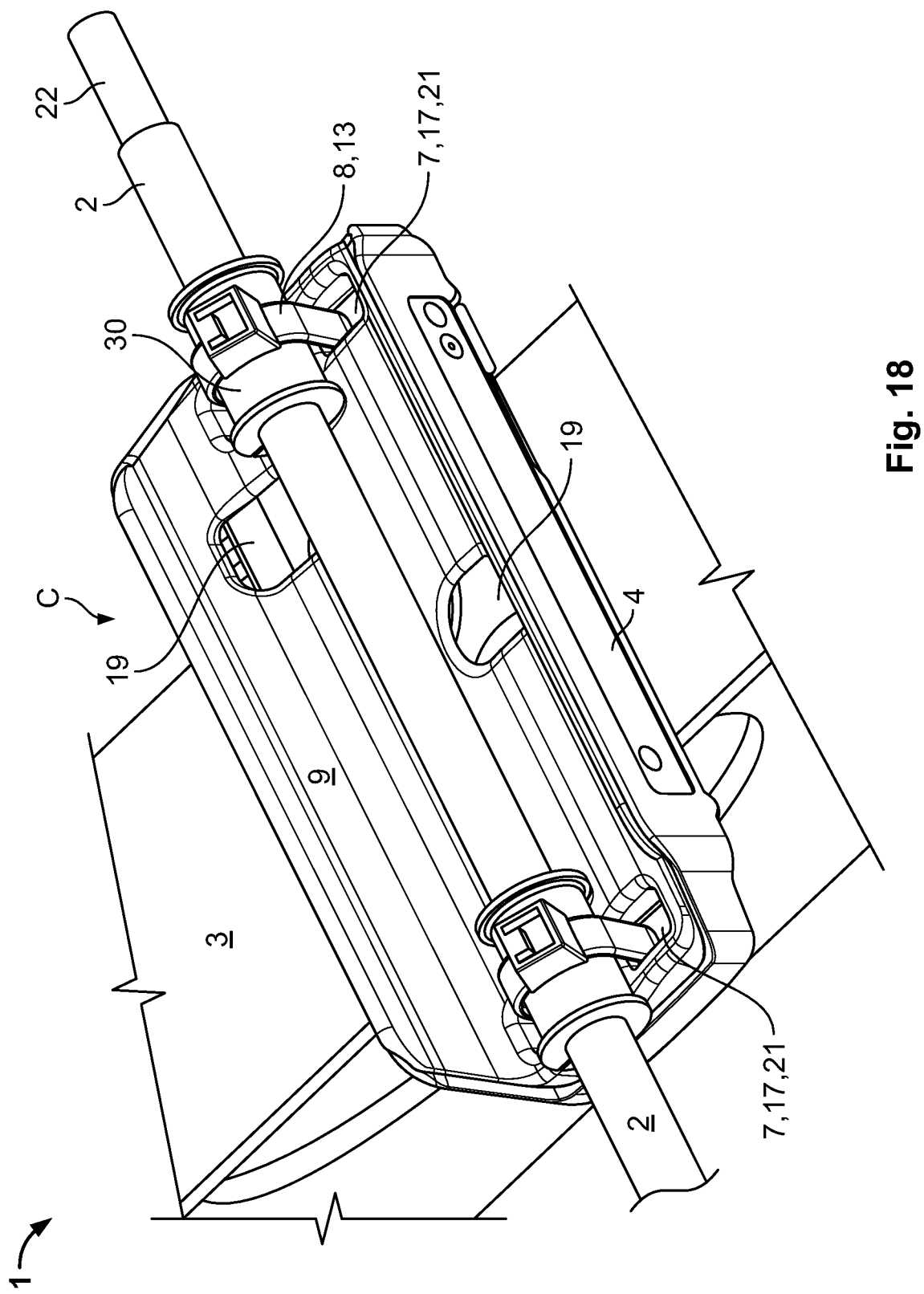
FIG. 18 is a perspective view of the mounting assembly of FIG. 17A.

The mounting assembly 1 is shown with the cable ties 13 used as the cable holding devices 8 in FIGS. 15A, 15B, and 16. The cable ties 13 run through the cover 9, the mounting bracket 4, and around the cable 2. The fact that the cable ties 13 run through the cover 9 and the mounting bracket 4 also blocks the movement of the two relative to each other out of the cable mounting position C. The mounting assembly 1 together with two cable ties 13 as cable holding devices 8 is shown in FIGS. 17A, 17B and 18, wherein in this case, a smaller cable 2 is mounted. Bobbins 13 are attached to the cable 2 so that the cable 2 is not deformed by the force exerted by the cable ties 13.

What is claimed is:

1. A mounting assembly for mounting a cable on an electrically conductive structure, comprising:
    a mounting bracket having a mounting element receptacle and a cable holding device receptacle, the mounting element receptacle receiving a mounting element that attaches the mounting bracket to the electrically conductive structure, the cable holding device receptacle receiving a cable holding device that holds the cable; and
    a cover mounted on the mounting bracket and movable with respect to the mounting bracket between a bracket mounting position and a cable mounting position, the mounting element receptacle is accessible from a cover side of the mounting bracket and the cable holding device receptacle is covered by the cover in the bracket mounting position, the mounting element receptacle is covered by the cover and the cable holding device receptacle is accessible from the cover side of the mounting bracket in the cable mounting position.

2. The mounting assembly of claim 1, wherein the mounting bracket and the cover are slidable relative to each other.

3. The mounting assembly of claim 1, further comprising a guiding device that guides a sliding movement of the cover with respect to the mounting bracket between the bracket mounting position and the cable mounting position.

4. The mounting assembly of claim 1, wherein the mounting bracket has a plurality of mounting element receptacles and all of the mounting element receptacles are accessible from the cover side of the mounting bracket in the bracket mounting position.

5. The mounting assembly of claim 1, wherein the mounting bracket has a plurality of cable holding device receptacles and all of the cable holding device receptacles are accessible from the cover side of the mounting bracket in the cable mounting position.

6. The mounting assembly of claim 1, wherein the mounting element receptacle is a through-hole extending through the mounting bracket.

7. The mounting assembly of claim 1, wherein the cable holding device receptacle is a through-hole extending through the mounting bracket.

8. The mounting assembly of claim 7, wherein the mounting bracket has a plurality of cable holding device receptacles and all of the cable holding device receptacles are through-holes extending through the mounting bracket.

9. The mounting assembly of claim 8, wherein the cover has a plurality of access holes that are each aligned with one of the cable holding device receptacles in the cable mounting position.

10. The mounting assembly of claim 1, wherein the cable holding device receptacle is a socket for a cable clip.

11. The mounting assembly of claim 1, further comprising a latch adapted to retain the cover on the mounting bracket in the cable mounting position.

12. The mounting assembly of claim 1, wherein the cable holding device blocks the cover from moving from the cable mounting position to the bracket mounting position when the cable holding device is mounted to the cable holding device receptacle.

13. The mounting assembly of claim 9, wherein the mounting element is accessible through one of the access holes of the cover in the bracket mounting position.

14. The mounting assembly of claim 1, wherein the cover forms an insulating barrier between the cable and the mounting element in the cable mounting position.

15. A kit for a mounting assembly, comprising:
    a mounting bracket having a mounting element receptacle and a cable holding device receptacle, the mounting element receptacle receiving a mounting element and the cable holding device receptacle receiving a cable holding device; and
    a cover mounted on the mounting bracket and movable with respect to the mounting bracket between a bracket mounting position and a cable mounting position, the mounting element receptacle is accessible from a cover side of the mounting bracket and the cable holding device receptacle is covered by the cover in the bracket mounting position, the mounting element receptacle is covered by the cover and the cable holding device receptacle is accessible from the cover side of the mounting bracket in the cable mounting position.

* * * * *